US006842217B1

(12) United States Patent
Miller et al.

(10) Patent No.: US 6,842,217 B1
(45) Date of Patent: Jan. 11, 2005

(54) FABRY-PEROT ETALONS AND TUNABLE FILTERS MADE USING LIQUID CRYSTAL DEVICES AS TUNING MATERIAL

(75) Inventors: Peter J. Miller, Newburyport, MA (US); Randall J. Deary, Littleton, MA (US)

(73) Assignee: Cambridge Research and Instrumentation, Inc., Woburn, MA (US)

( * ) Notice: Subject to any disclaimer, the term of this patent is extended or adjusted under 35 U.S.C. 154(b) by 0 days.

(21) Appl. No.: 10/226,610

(22) Filed: Aug. 23, 2002

Related U.S. Application Data

(60) Provisional application No. 60/314,460, filed on Aug. 23, 2001.

(51) Int. Cl.[7] ........................... G02F 1/13; G02F 1/1337
(52) U.S. Cl. ........................................ 349/198; 349/123
(58) Field of Search .................................. 349/198, 123

(56) References Cited

U.S. PATENT DOCUMENTS

| | | | | |
|---|---|---|---|---|
| 5,510,914 A | * | 4/1996 | Liu et al. ..................... | 349/136 |
| 5,592,314 A | * | 1/1997 | Ogasawara et al. ........... | 349/18 |
| 5,689,314 A | * | 11/1997 | Mercer .......................... | 349/1 |
| 5,781,268 A | * | 7/1998 | Liu et al. ..................... | 349/198 |
| 5,784,507 A | * | 7/1998 | Holm-Kennedy et al. .... | 385/31 |
| 5,953,087 A | * | 9/1999 | Hoyt ............................ | 349/58 |
| 5,982,488 A | * | 11/1999 | Shirasaki ..................... | 356/519 |
| 5,992,312 A | * | 11/1999 | Faber ........................... | 101/105 |
| 6,313,898 B1 | * | 11/2001 | Numano et al. ............ | 349/129 |
| 6,639,648 B2 | * | 10/2003 | Kataoka ..................... | 349/198 |
| 2002/0136104 A1 | * | 9/2002 | Daiber ..................... | 369/44.23 |
| 2003/0007522 A1 | * | 1/2003 | Li et al. ....................... | 372/20 |

OTHER PUBLICATIONS

Hirabayashi et al., "Tunable Liquid–Crystal Fabry–Perot . . . ," Journal of Lightwave Technology, 11(12):2033–2043.

* cited by examiner

*Primary Examiner*—Kenneth Parker
(74) *Attorney, Agent, or Firm*—Fish & Richardson P.C.

(57) ABSTRACT

Fabry-Perot etalons including a layer of liquid crystal between the reflective surfaces are disclosed. Application of an electric field to the liquid crystal layer changes the effective refractive index of the liquid crystal layer, making the device tunable.

33 Claims, 20 Drawing Sheets

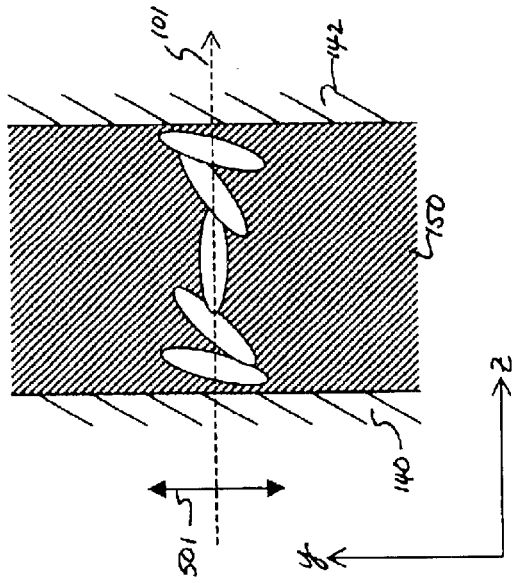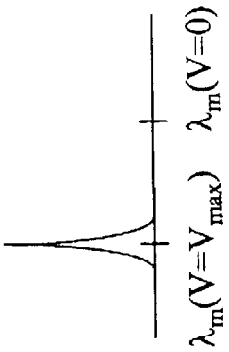
FIG. 4(a)
FIG. 4(b)
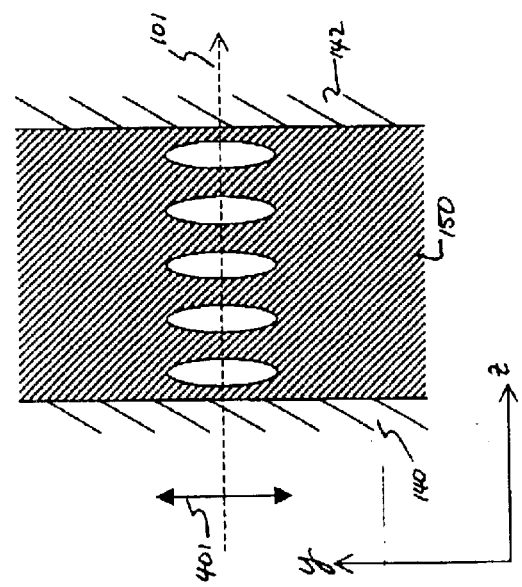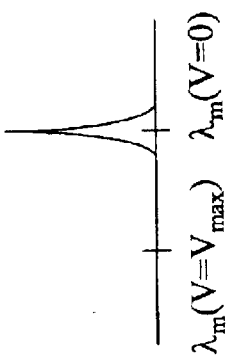
FIG. 5(a)
FIG. 5(b)

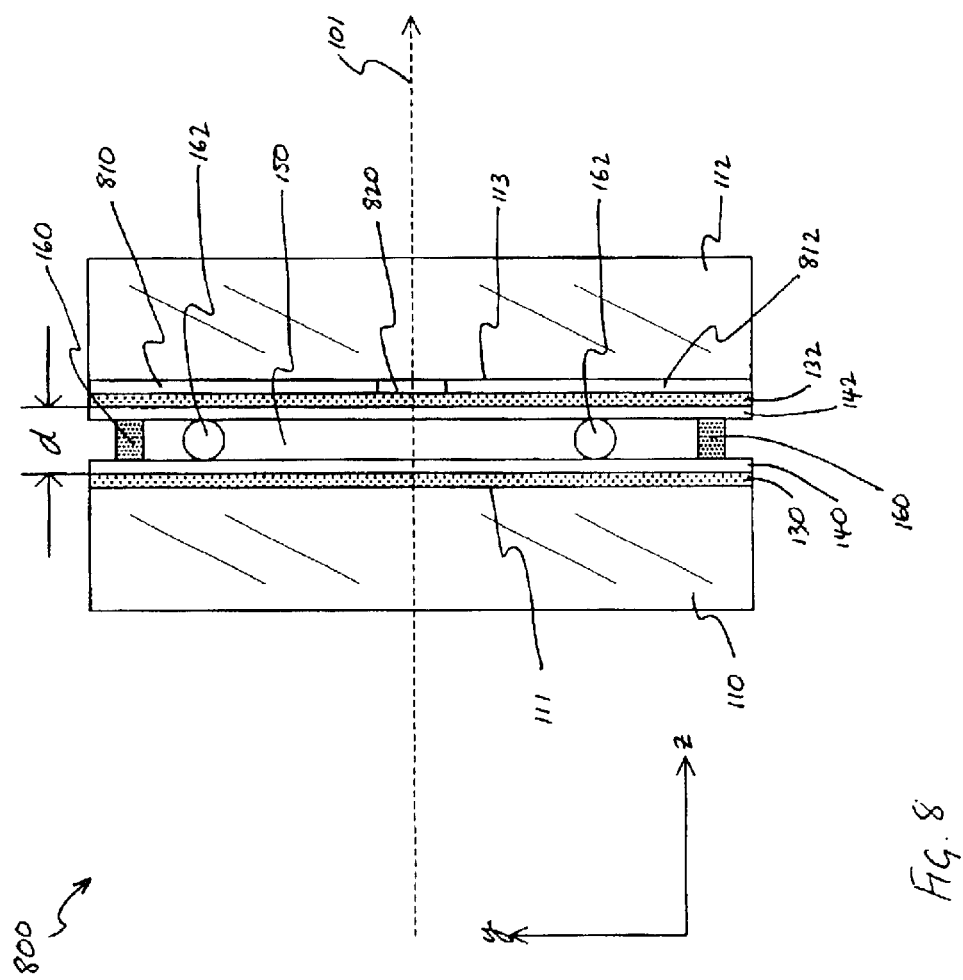

US 6,842,217 B1

FABRY-PEROT ETALONS AND TUNABLE FILTERS MADE USING LIQUID CRYSTAL DEVICES AS TUNING MATERIAL

CROSS-REFERENCE TO RELATED APPLICATIONS

This application claims priority to Provisional Patent Application 60/314,460, entitled "FABRY-PEROT ETALONS AND TUNABLE FILTERS MADE USING LIQUID CRYSTAL DEVICES AS TUNING MATERIAL," to Peter J. Miller, and filed on Aug. 23, 2001.

BACKGROUND

This invention relates to tunable filters and Fabry-Perot etalons.

Wavelength-division multiplexing (WDM) systems are an efficient means for increasing the transmission capacity of telecommunications networks. WDM refers to simultaneously sending multiple signals through a single fiber, wherein each signal has a different wavelength. Separating different signals in a WDM system requires filters having transmission and/or reflection bands that are at least as narrow as the wavelength different between adjacent signals.

A Fabry-Perot etalon is an example of an optical filter. A Fabry-Perot etalon is an optical device that can transmit light at a series of discrete wavelength bands. Light entering the Fabry-Perot etalon enters an optical cavity that is bounded by a pair of reflective surfaces. The reflective surfaces are separated by a precisely controlled distance that determines a set of transmission wavelengths for the filter. The transmission properties of a Fabry-Perot etalon are dependent on parameters such as the reflectivity of the reflective surfaces and the separation of the reflective surfaces. For example, the higher the surface reflectivity, the narrower the transmission bands. Also, the smaller the separation, the further apart the transmission bands are in wavelength. That is, the smaller the separation, the larger the free spectral range (FSR) of the filter.

A tunable Fabry-Perot etalon adds an adjustable component to the separation by which the peak wavelengths of the transmission bands can be changed. Tuning can be achieved in a Fabry-Perot etalon by making one of the two reflectors a movable or deformable membrane and applying a voltage between the membrane and the second fixed reflector, thereby changing the cavity separation distance through electrostatic attraction. In such a device, the amount of deflection and, therefore, cavity length control, is dependent upon the distance between the reflectors and the level of the applied voltage.

In addition to depending on the separation of the reflective surfaces, the peak transmission wavelengths also depend on the refractive index of the medium between the reflective surfaces. Thus, a tunable Fabry-Perot etalon can also be achieved by including between the reflective surfaces a material with a variable refractive index. An example of such a material is a liquid crystal, which can change refractive index in response to an electric field.

SUMMARY

The invention provides Fabry-Perot etalons including a layer of liquid crystal between the reflective surfaces. Application of an electric field to the liquid crystal layer changes the effective refractive index of the liquid crystal layer, making the device tunable.

In general, in one aspect, the invention features a liquid crystal device, including two substrates sandwiching a layer of liquid crystal (e.g., a nematic liquid crystal or smectic liquid crystal, such as a ferroelectric liquid crystal), wherein each substrate supports at least a reflector and an alignment layer comprising polyvinyl alcohol, and wherein the reflectors define an Fabry-Perot etalon having a resonant wavelength, $\lambda_m$ (e.g., between 300 nm and 3,000 nm, between 900 nm and 1,600 mn, such as about 1550 nm)

Embodiments of the invention can include one or more of the following features.

The polyvinyl alcohol can be at least 95% hydrolyzed (e.g., at least 98% hydrolyzed). The Fabry-Perot etalon can have an absorption less than 5% at $\lambda_m$ (e.g., less than 2%, less than 1%, less than 0.5%).

Each substrate can further support an electrode. The electrode can be positioned between the reflector and the substrate. In some embodiments, at least one substrate supports a pair of electrodes. The pair of electrodes can be separated by a minimum distance equal to or greater than 10 $\mu$m (e.g., greater than 20 $\mu$m, greater than 50 $\mu$m). Electrodes can include a material substantially transparent at $\lambda_m$ (e.g., ITO, $SnO_2$, or a semiconductor). The liquid crystal device can further include a controller coupled to the electrodes, which during operation applies a voltage across the liquid crystal layer.

In the absence of an electric field in the liquid crystal layer, liquid crystal in the liquid crystal layer can be homogeneously aligned parallel to the reflectors. Alternatively, in the absence of an electric field in the liquid crystal layer, liquid crystal in the liquid crystal layer can be homeotropically aligned orthogonal to the reflectors.

The reflectors can be separated by a minimum distance equal to or greater than 1 $\mu$m (e.g., equal to or greater than 2 $\mu$m, 3 $\mu$m, 4 $\mu$m, 5 $\mu$m, 8 $\mu$m, 10 $\mu$m, 12 $\mu$m, 13 $\mu$m, 14 $\mu$m, 15 $\mu$m, 16 $\mu$m, 17 $\mu$m, 18 $\mu$m, 19 $\mu$m, 20 $\mu$m, 22 $\mu$m, 24 $\mu$m, 25 $\mu$m, 28 $\mu$m, 30 $\mu$m, 40 $\mu$m, 50 $\mu$m). The liquid crystal device can include spacers positioned between the substrates to maintain the minimum distance between the reflectors.

The alignment layers can be buffed alignment layers. Alternatively, the alignment layers can be stretched alignment layers (i.e., the poly vinyl alcohol is stretched poly vinyl alcohol).

In some embodiments, at least one of the alignment layers can include an aperture region substantially devoid of the alignment material. In such cases, typically both of the alignment layers will include an aperture region devoid of the alignment material. The substrates can be arranged so that there exists an optical path through the aperture region on in each alignment layer along which an optical signal can traverse the Fabry-Perot etalon without traversing alignment material. The liquid crystal device can include a source positioned to direct the optical signal through the aperture region.

In some embodiments, an outer surface of at least one of the two substrates can be non-parallel to the reflectors. Alternatively, or additionally, a first one of the substrates can have a first region that is thinner than a second region of the first substrate. The first region of the first substrate can be sufficiently thin relative to the second region of the first substrate to relieve stress caused by thermal expansion and contraction of the liquid crystal over a range of operating temperatures.

The reflectors can include dielectric mirrors, configured to reflect light having wavelength $\mu_m$. Alternatively, or additionally, the reflectors can include a metal layer.

The Fabry-Perot etalon can have a finesse greater than 10 (e.g., greater than 20, greater than 30, greater than 40, greater than 50, greater than 60, greater than 75, greater than 100, greater than 120, greater than 150, greater than 175, greater than 200, greater than 250, greater than 300, greater than 500).

The liquid crystal device can have a transmission at $\lambda_m$ greater than 50% (e.g., greater than 60%, greater than 70%, greater than 80%, greater than 90%, greater than 95%, greater than 97%, greater than 98%, greater than 99%, greater than 99.5%).

The layer of liquid crystal has an effective refractive index, and during operation the effective refractive index can change in response to an electric field in the liquid crystal layer. The resonance wavelength, $\lambda_m$, can change in response to the change in the effective refractive index. For example, $\lambda_m$ can change within a tuning range, and the tuning range is related to a birefringence of the liquid crystal.

In some embodiments, the liquid crystal device can further include an optical filter supported by at least one of the substrates and located outside the Fabry-Perot etalon. The optical filter can substantially transmit a wavelength band including $\lambda_m$. Alternatively, or additionally, the liquid crystal device can further include a member attached to a first region of at least one of the substrates, wherein the member reduces variations of a minimum distance between the reflectors caused by thermal expansion and contraction of the liquid crystal over a range of operating temperatures in the first region relative to a minimum distance between the reflectors in a second region difference from the first region.

In another aspect, the invention features a liquid crystal device, include two substrates sandwiching a layer of liquid crystal, wherein each substrate supports at least an electrode, a reflector and an alignment layer comprising an alignment material, wherein at least one of the alignment layers comprises an aperture region substantially devoid of the alignment material.

Embodiments of the liquid crystal device may include one or more of the following features. Embodiments of the invention may alternatively, or additionally, include any of the features described in relation to the aforementioned aspect of the invention.

Both of the alignment layers can include an aperture region devoid of the alignment material. Typically, the liquid crystal device will be constructed so that the aperture region in the alignment layer of a first of the two substrates is registered with the aperture region in the alignment layer of a second of the two substrates. The registered aperture regions define an optical path through which an optical signal can traverse the Fabry-Perot etalon without traversing alignment material. The liquid crystal device can also include a source that directs an optical signal along the optical path.

The aperture region can have a minimum dimension greater than 10 μm (e.g., greater than 50 μm, greater than 0.5 mm, greater than 1 mm).

The alignment layers can be buffed alignment layers. Alternatively, or additionally, the alignment layers can include a stretched polymer. The alignment layers can also be photo-aligned alignment layers.

The alignment layers can include a polymer (e.g., poly vinyl alcohol or a polyimide).

In another aspect, the invention features a liquid crystal device, including two substrates sandwiching a layer of liquid crystal, wherein each substrates supports at least an electrode and a reflector, wherein the reflectors define a Fabry-Perot etalon having a resonant wavelength, $\lambda_m$, and an outer surface of at least one of the two substrates is non-parallel to the reflectors.

Embodiments of the liquid crystal device may include one or more of the following features. Embodiments of the invention may alternatively, or additionally, include any of the features described in relation to the aforementioned aspects of the invention.

In some embodiments, the outer surface of both of the two substrates are non-parallel to the reflectors. At least one of the substrates can be in the form of a wedge.

In a further aspect, the invention features a liquid crystal device, including two substrates sandwiching a layer of liquid crystal, wherein each substrate supports a reflector and an alignment layer, wherein the reflectors define a Fabry-Perot etalon having a resonant wavelength, $\lambda_m$, and one of the substrates supports a pair of electrodes.

Embodiments of the liquid crystal device may include one or more of the following features. Embodiments of the invention may alternatively, or additionally, include any of the features described in relation to the aforementioned aspects of the invention.

For example, the pair of electrodes can be separated by a gap having a minimum dimension of more than 10 μm (e.g., more than 20 μm, more than 50 μm, more than 100 μm, more than 0.5 mm, more than 1 mm).

Applying a voltage between the pair of electrodes can create an electric field in the liquid crystal layer, and at least a portion of the electric field is parallel to the reflectors. The liquid crystal device can also include a controller coupled to the pair of electrodes, which during operation applies a voltage between the pair of electrodes.

In another aspect, the invention features a method for operating a tunable Fabry-Perot etalon, including driving the Fabry-Perot etalon at a first voltage, $V_1$, wherein the Fabry-Perot etalon has a peak transmission wavelength at the first voltage, $V_1$, and also exhibits the same peak transmission wavelength at a second voltage $V_2$, where $V_1 > V_2$.

Implementations of the method can include one or more of the following features.

In some embodiments, transmission of the Fabry-Perot etalon at the peak transmission wavelength at $V_1$ is greater than transmission of the Fabry-Perot etalon at the peak transmission wavelength at $V_2$. For example, transmission at the peak transmission wavelength at $V_1$ can be at least 1% greater (e.g., at least 2% greater, at least 3% greater, at least 4% greater, at least 5% greater, at least 8% greater, at least 10% greater) than transmission at the peak transmission wavelength at $V_2$.

At $V_1$ the value of an order parameter of liquid crystal in the liquid crystal layer can be greater than the value of the order parameter at $V_2$. Accordingly, at $V_1$, an amount of light having a wavelength, $\lambda_s$, scattered by the liquid crystal layer can be less than an amount of light having wavelength, $\lambda_s$, scattered by the liquid crystal layer at $V_2$.

The peak transmission wavelength at $V_1$ can correspond to a different resonance order (e.g., a lower resonance order) of the Fabry-Perot etalon than at $V_2$.

Any of the liquid crystal devices described in relation to the other aspects of the invention can be adapted to implement the method.

In another aspect, the invention features a liquid crystal device, including two substrates sandwiching a layer of liquid crystal, wherein each substrate supports at least an electrode, a reflector and an alignment layer, wherein the reflectors define a Fabry-Perot etalon having a resonant wavelength and wherein the reflectors are separated by a distance, and the liquid crystal layer has a liquid crystal birefringence, and the distance and the liquid crystal birefringence are sufficiently large to provide the same resonant wavelength at more than one drive voltage applied across the liquid crystal layer. The liquid crystal device also includes a controller coupled to the electrodes, which during operation applies a higher of the more than one drive voltages across the liquid crystal layer.

Embodiments of the liquid crystal device may include one or more of the features described in relation to the other aspects of the invention. Moreover, the liquid crystal device can be adapted to implement the above-described method.

In a further aspect, the invention features a liquid crystal device, including two substrates sandwiching a layer of liquid crystal, wherein each substrate supports at least an electrode, a reflector and an alignment layer, wherein the reflectors define a Fabry-Perot etalon having a resonant wavelength, $\lambda_m$, and a first one of the substrates has a first region that is thinner than a second region of the first substrate In some embodiments, the first region of the first substrate is sufficiently thin relative to the second region of the first substrate to relieve stress caused by thermal expansion and contraction of the liquid crystal over a range of operating temperatures. Embodiments of the invention can include any of the features described in relation to other aspects of the invention.

In another aspect, the invention features a liquid crystal device, including two substrates sandwiching a layer of liquid crystal, wherein each substrate supports at least a reflector and an alignment layer, wherein the reflectors define an Fabry-Perot etalon having a resonant wavelength, $\lambda_m$, and a first one of the substrates comprises a wedge.

Embodiments of the invention can include any of the features described in relation to other aspects of the invention.

In another aspect, the invention features a liquid crystal device, including two substrates sandwiching a layer of liquid crystal, wherein each substrate supports at least a reflector and an alignment layer, and the reflectors define an optical cavity having a resonant wavelength, $\lambda_m$, and an optical filter supported by at least one of the substrates and located outside the Fabry-Perot etalon.

In some embodiments, the optical filter substantially transmits a wavelength band including $\lambda_m$. Embodiments of the invention can include any of the features described in relation to other aspects of the invention.

Embodiments of the invention can include one or more of the following advantages.

Liquid crystal etalons can have low absorption (e.g., less than about 10%) at the peak transmission wavelength. Accordingly, liquid crystal etalons can have a high finesse and a high transmission at the peak transmission wavelength. Also, liquid crystal etalons can have low drive voltages, and hence, low power budgets. Liquid crystal etalons can also provide stable operation over a broad range of operating temperatures.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 4(a) is a schematic diagram showing a homogeneously aligned liquid crystal layer with zero applied voltage, and FIG. 4(b) shows a corresponding Fabry-Perot etalon transmission spectrum;

FIG. 5(a) is a schematic diagram showing the homogeneously aligned liquid crystal layer with a non-zero applied voltage, and FIG. 5(b) shows a corresponding Fabry-Perot etalon transmission spectrum;

FIG. 8 is a cross-sectional view of a further embodiment of a liquid crystal Fabry-Perot etalon;

Like reference symbols in the various drawings indicate like elements.

DETAILED DESCRIPTION

Figure 1:
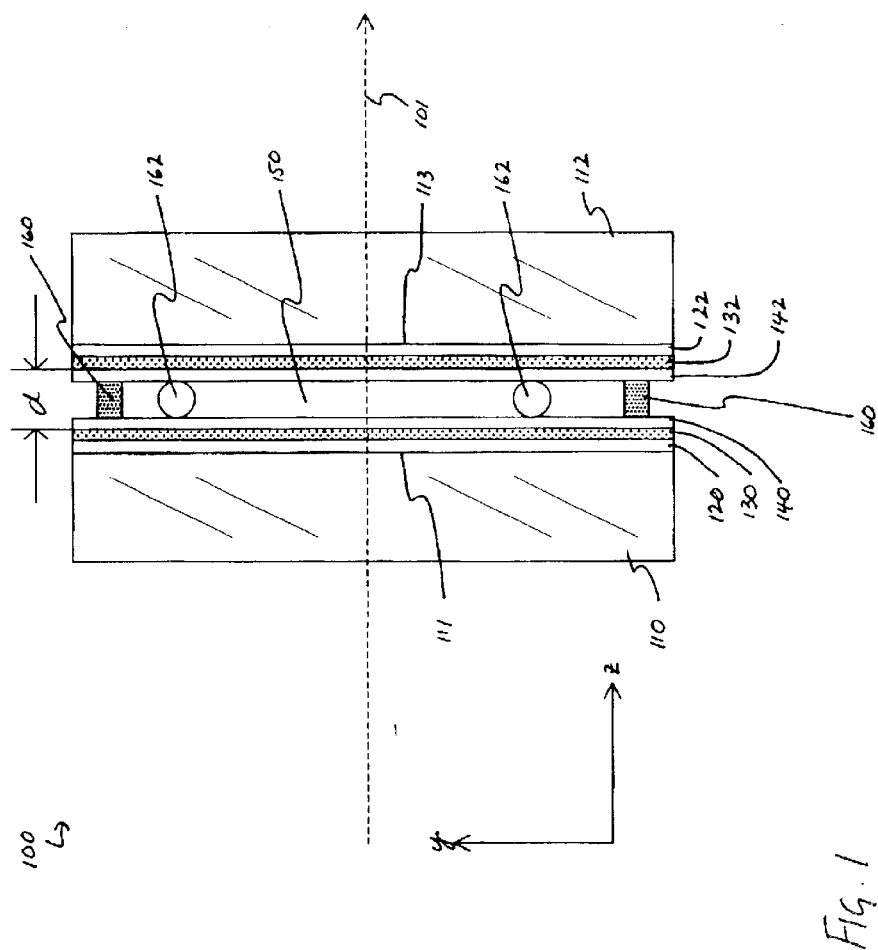
FIG. 1 is a cross-sectional view of an embodiment of a liquid crystal Fabry-Perot etalon.
Figure 2:
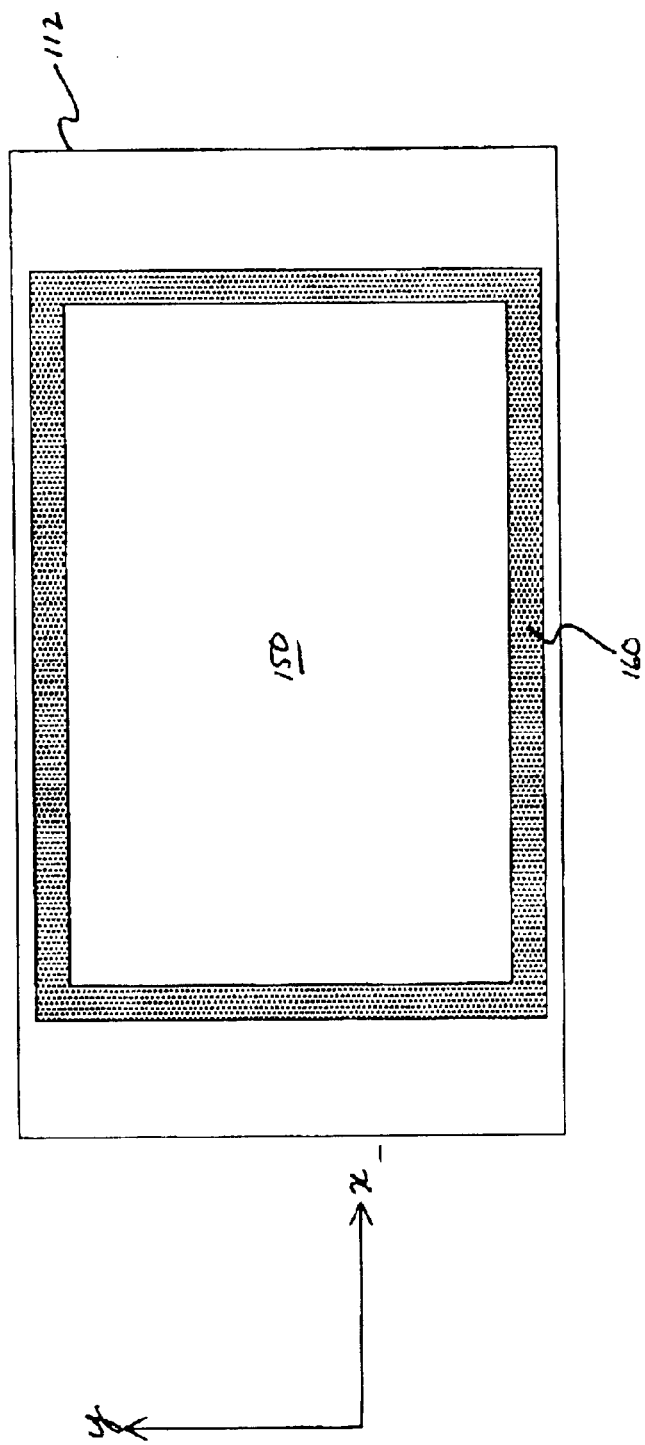
FIG. 2 is a plan view of the liquid crystal Fabry-Perot etalon of FIG. 1.
Figure 3:
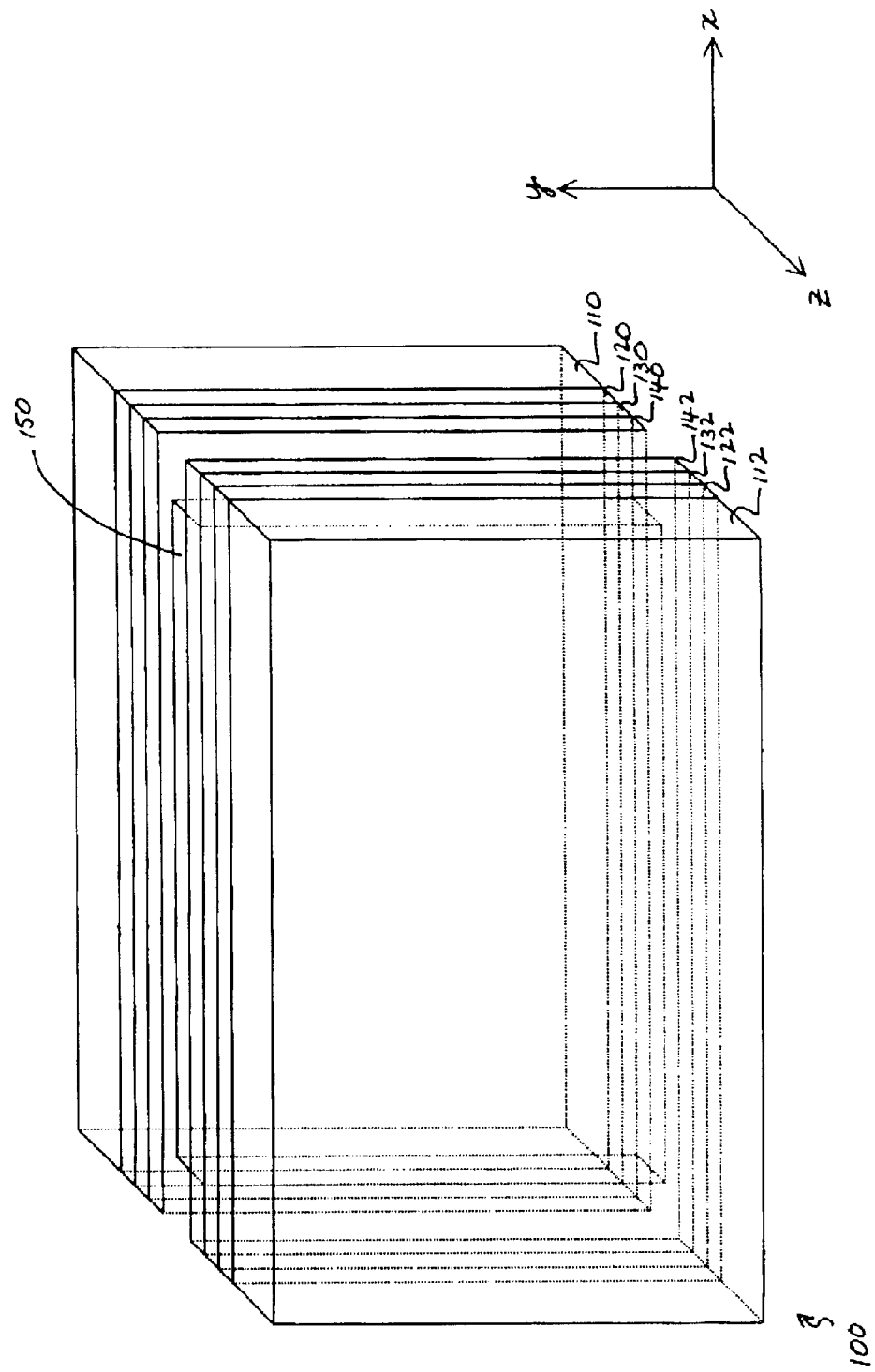
FIG. 3 is a perspective view of the liquid crystal Fabry-Perot etalon of FIG. 1.

Referring to FIG. 1, FIG. 2, and FIG. 3, a liquid-crystal Fabry-Perot etalon 100 modulates the transmission of a polarized optical signal propagating along optical axis 101. Optical axis 101 is parallel to a z-axis of a Cartesian co-ordinate system, included for reference. Liquid crystal Fabry-Perot etalon 100 includes a layer of liquid crystal 150 sandwiched between glass substrates 110 and 112. An electrode layer 120, a reflector 130 and an alignment layer 140 are disposed on inner surface 111 of glass substrate 110. Similarly, electrode layer 122, reflector 132, and alignment layer 142 are disposed on inner surface 113 of glass substrate 112. An edge seal 160 seals liquid crystal layer 150 between substrates 110 and 112. Fiber spacers 162 maintain uniform separation between substrates 110 and 112.

Reflectors 130 and 132 are coplanar to the x-y plane and form an optical cavity having resonant wavelengths, $\lambda_m$, given by $$\lambda_m = \frac{2nd}{m}, \quad (1)$$

where n is the effective refractive index of liquid crystal layer 150, d is the distance between reflector 130 and reflector 132. Here, m is an integer corresponding to the order of the resonant wavelength. Because of the ordering of the molecules, liquid crystal layer 150 exhibits a strong optical birefringence. In other words, there are two modes of optical propagation, each with a unique phase velocity. Due to the birefringence of liquid crystal layer 150, effective refractive index, n, depends on the polarization of an incident optical signal relative to the orientation of the liquid crystal molecules in liquid crystal layer 150. For example, when the optical signal's electric field is polarized parallel to the long axis of the liquid crystal molecules, the effective refractive index is approximately equal to $n_e$, the extraordinary liquid crystal index. However, if the optical signal's electric field is polarized orthogonal to the long axis of the liquid crystal molecules, the effective refractive index is approximately equal to $n_o$, the ordinary index of the liquid crystal.

Reflectors 130 and 132 are dielectric mirrors, formed by depositing alternating layers of high and low index materials on electrodes 120 and 122, respectively. Reflectors 130 and 132 have high reflectance (e.g., more than 50%, more than 60%, more than 70%, more than 80%, more than 90%, more than 95%, more than 98%, more than 99%, more than 99.5%, more than 99.9%) for a spectral band, $\Delta\Lambda$, centered at a central wavelength, $\Lambda_0$. In general, $\Lambda_0$ is between 300 nm and 3,000 nm, although for the wavelength range from 900 mn to about 1,600 nm is particularly relevant for telecommunications applications. $\Delta\Lambda = \Lambda_{high} - \Lambda_{low}$, where $\Lambda_{high}$ and $\Lambda_{low}$ are the wavelengths of the reflectors upper and lower band edges, respectively Generally, $\Delta\Lambda$ is selected so that $\Lambda_{low} < \lambda_m < \Lambda_{high}$ for at least one value of m.

In the described embodiment, the reflectance of reflector 130 is the same as the reflectance of reflector 132, however, in other embodiments, these reflectances can be different. The thickness, refractive index, and number of layers in reflectors 130 and 132 determine their reflectance, and determine their $\Delta\Lambda$ and $\Lambda_0$. For example, the larger the refractive index mismatch between adjacent layers in the dielectric mirrors, the larger the width of the reflected band, $\Delta\Lambda$. The bandwidth can be less than or equal to 50 nm (e.g., less than 40 nm, such as 20 nm or less). Alternatively, $\Delta\Lambda$ can be greater than 50 nm (e.g., greater than 100 nm, such as 200 nm or more). The optical thickness of adjacent layers determines the central wavelength, $\Lambda_0$. The number of layers and refractive index mismatch between the layers determines the reflectance: the more layers and higher refractive index mismatch, the higher the reflectance at $\Lambda_0$.

Moreover, while in the present embodiment the reflectors are dielectric mirrors, other reflectors can be used. For example, the reflectors can be layers of a metal reflective at $\lambda_m$, such as layers of silver.

Electrodes 120 and 122 are positioned outside of the optical cavity. Thus, the electrodes do not contribute to any absorption of an optical signal within the optical cavity. Electrodes 120 and 122 are formed from ITO, which is transparent in the spectral region of interest (e.g., 300 nm to 3,000 nm) and has high electric conductivity. The electrodes are sufficiently thin to reduce optical signal transmission loss due to absorption by the ITO, while providing sufficient electrical conductivity (e.g., 1,000 to 3,000 Ohms per square). Although the electrodes are formed from ITO in the described embodiment, other materials can be used to form electrodes 120 and 122. Alternative electrode materials include $SnO_2$ and transparent semiconductors, including doped semiconductors.

In typical electrodes, the electrode thickness is in the range of 100 nm–1,000 nm, such as 300 nm. In some embodiments, the thickness of the electrode layer is selected to provide constructive interference between the light transmitted directly through the electrode layer and light that is once reflected by the interface between the electrode layer and the glass substrate, and the interface between the electrode layer and the reflector. This can increase transmission of the optical signal through the electrode layers.

Alignment layers 140 and 142 are layers of buffed polymer (e.g., polyimide or PVA), providing homogeneous alignment of liquid crystal molecules in liquid crystal layer 150 parallel to the y-axis. Note that other alignment modes can also be used. For example, in some embodiments, twisted or super-twisted alignment modes can be used.

Liquid crystal layer 150 is layer of anisotropic organic molecules that exhibit a nematic liquid crystal phase within an operating temperature range (e.g., between 0° C. and 150° C.). Most commercially available liquid crystals are mixtures of several compounds, formulated to provide specific characteristics related to the applications (e.g., birefringence, dielectric anisotropy, nematic temperature range, etc.). While liquid crystal layer 150 in the present embodiment is a nematic liquid crystal layer, other types of liquid crystal can also be used, for example, a smectic liquid crystal, such as a ferroelectric liquid crystal can be used.

The thickness of layer 150 is controlled by spacers 162 and is usually on the order of microns to tens of microns (e.g., about 1 µm, about 2 µm, about 4 µm, about 10 µm, about 20 µm). The thickness is selected according to performance criteria (e.g., transmission wavelength range and/or operating voltage range) of the Fabry-Perot etalon and parameters of the liquid crystal in liquid crystal layer 150. These parameters include, e.g., liquid crystal birefringence, liquid crystal dielectric anisotropy, and elastic constants of the liquid crystal.

Liquid crystal birefringence, $\Delta n$, is defined as $\Delta n \equiv n_e - n_o$. In the present embodiment, $\Delta n$ is positive, although $\Delta n$ can also be negative. Typically, $\Delta n$ is between about –0.05 and +0.20. Liquid crystal dielectric anisotropy, $\Delta\in$, refers to the differing value of the dielectric constant parallel and orthogonal to the symmetry axis of the liquid crystal, which are expressed as $\in_\parallel$ and $\in_\perp$, respectively. $\Delta\in$ is defined as $\Delta\in \equiv \in_\parallel - \in_\perp$. In the described embodiment, $\Delta\in$ is positive, although $\Delta\in$ can also be negative. Typical values for $\Delta\in$ are between about –2 and +15.

In the nematic phase, liquid crystal molecules are rod-like with their long axes aligned approximately parallel to one another. Thus, at any point in liquid crystal layer 150, one can define a vector, n̂, to represent the preferred orientation in the immediate neighborhood of the point. This vector is known as the director. Note, n̂ is not the same as n, which denotes the effective refractive index of the liquid crystal. In a homogeneous liquid crystal layer (e.g., in the zero applied field state), the director is constant throughout the liquid crystal layer. In an inhomogeneous liquid crystal layer (e.g., in liquid crystal layer 150 with an applied electric field), the director can change from point to point and is, in general, a function of position (x, y, z). Defining a unit vector to represent the long axis of each liquid crystal molecule, the director n is the statistical average of the unit vectors of a small volume element around the point.

The liquid crystal order parameter, S, is defined as $$S = \frac{1}{2}\langle 3\cos^2\theta - 1\rangle \quad (2)$$

where $\theta$ is the angle between the long axis of an individual liquid crystal molecule and the director, and the angular brackets denotes a statistical average. Thus, for perfectly parallel alignment, S=1, while for totally random alignment, S=0. In the nematic phase, the order parameter S has an intermediate value that is strongly temperature dependent. It is evident that S=0 at the clearing point (i.e., the temperature at which the liquid crystal phase changes to an isotropic liquid). Typical values of the order parameter are in the range between 0.4 and 0.6 at low temperatures (e.g., reduced temperatures below about 0.8).

The liquid crystal in liquid crystal layer 150 can have a low absorption coefficient at the operating wavelength. For example, the liquid crystal can have an absorption coefficient less than 1 $cm^{-1}$ (e.g., less than 0.5 $cm^{-1}$, less than 0.1 $cm^{-1}$, less than 0.05 $cm^{-1}$).

Referring now to FIG. 4(*a*) and FIG. 4(*b*), in the absence of an applied voltage across the electrodes, the ordering of the liquid crystal molecules is determined by alignment layers 140 and 142. The liquid crystal molecules are aligned with their axes parallel to the buffing direction of alignment layers 140 and 142. Long range ordering of liquid crystal molecules through liquid crystal layer 150 results in homogeneous parallel alignment of liquid crystal molecules through liquid crystal layer 150. Accordingly, for an optical signal 401 polarized parallel to the buffing direction (i.e., parallel to the y-axis), peak transmission occurs at approximately $$\lambda_m(V=0) = \frac{2n_e d}{m}.$$

Note, V=0 refers to zero applied voltage across the electrodes.

Referring to FIG. 5(*a*) and FIG. 5(*b*), when voltage of sufficient magnitude is applied across the electrodes, the positive dielectric anisotropy of liquid crystal molecules cause the molecules to align parallel to the electric field generated in liquid crystal layer 150 by the applied voltage. At the center of liquid crystal layer 150, the effective refractive index of the liquid crystal for an optical signal 501 polarized parallel to the buffing direction is $n_o$, and peak transmission occurs at approximately $$\lambda_m(V=V_{max}) = \frac{2n_o d}{m},$$

where $V_{max}$ is the voltage applied across the electrodes to generate the electric field.

For a voltage, V, where $0<V<V_{max}$, the effective refractive index of the liquid crystal will be between $n_o$ and $n_e$ (i.e., $n_o<n<n_e$), and the transmission peak of the m-th resonant wavelength is correspondingly between $\lambda_m(V=0)$ and $\lambda_m(V=V_{max})$. Hence, Fabry-Perot etalon 100 is a tunable filter with a spectral tuning range equal to approximately $$\Delta\lambda_m = \frac{2\Delta n d}{m}. \quad (3)$$

Note, $\Delta\lambda_m$ is proportional to $\Delta n$ and to d. Accordingly, the tuning range of liquid crystal Fabry-Perot etalon 150 can be selected to have a desired range by selecting a liquid crystal with the appropriate value of $\Delta n$ and/or choosing the thickness of liquid crystal layer 150.

In some embodiments, $\Delta n$ and d can be selected so that Fabry-Perot etalon 100 has a small tuning range (e.g., less than 50 nm, such as 20 nm or less). Alternatively, $\Delta n$ and d can be selected so that Fabry-Perot etalon 100 has a large tuning range (e.g., more than 50 nm, such as 100 nm or more)

Ignoring reflective and absorptive losses to an optical signal outside the optical cavity, the transmission of Fabry-Perot etalon 100 is given by $$T = \frac{T_{max}}{1 + \left(\frac{2}{\pi}\frac{2R}{(1-R)^2}\right)^2 \sin(2\pi n d/\lambda)}, \quad (4)$$

where R is the reflectance of reflectors 130 and 132, and $T_{max}$ is the peak Fabry-Perot etalon transmission, which occurs at the resonance wavelength and is given by:

$$T_{max} = \left[1 - \frac{A}{(1-R)}\right]^2. \quad (5)$$

Here, A is the absorption of the Fabry-Perot etalon. The transmission spectrum of Fabry-Perot etalon 150 thus includes a series of discrete peaks corresponding to the $\lambda_m$'s of the Fabry-Perot etalon.

Fabry-Perot etalon 100 can have high maximum transmission at values of $\lambda_m$. For example, $T_{max}$ can be more than 50% (e.g., more than 60%, more than 70%, more than 80%, more than 90%, such as 95% or more). Correspondingly, in its transmissive state, Fabry-Perot etalon 100 can have low insertion loss for an optical signal at $\lambda_{max}$. For example, the insertion loss of Fabry-Perot etalon 160 can be less than 5 dB (e.g., less than 2 dB, such as 1 dB or less).

A parameter for characterizing Fabry-Perot etalon 100 is the ratio of the separation of adjacent transmission maxima to the transmission peak half-width. This quality is known as the Fabry-Perot etalon's finesse, F, and is given by:

$$F = \frac{\pi\sqrt{R}}{1-R} \quad (6)$$

According to Eq. (6), the finesse, F, of Fabry-Perot etalon 100 depends of the reflectance of reflectors 130 and 132. In some embodiments, the Fabry-Perot etalon has a low finesse (e.g., less than 20, such as 10 or lower). Alternatively, the Fabry-Perot etalon can have a high finesse (e.g., more than 20, more than 100, such as 200 or more).

Another parameter for characterizing Fabry-Perot etalon 100 is the spectral separation of adjacent $\lambda_m$'s. This parameter is known as the free spectral range (FSR) and is given by $$FSR = \frac{\lambda_m}{m+1} \simeq \frac{\lambda_m^2}{2nd}. \quad (7)$$

The ratio of the FSR to F is the bandwidth, B, of Fabry-Perot etalon 100:

$$B = \frac{FSR}{F} \simeq \frac{\lambda_m^2}{2nd \cdot F} \quad (8)$$

In some embodiments, it is desirable for Fabry-Perot etalon 100 to have a large finesse and high $T_{max}$. Finesse can be increased by increasing the reflectance, R, of reflectors 120 and 122. According to Eq. (5), an increase in R causes a reduction in $T_{max}$. However, $T_{max}$ is quadratic in Fabry-Perot etalon absorption, A. Thus, for Fabry-Perot etalon 100 to have a large finesse and high $T_{max}$, absorption A should be reduced as much as possible.

There are numerous ways to reduce A in Fabry-Perot etalon 100. Following are descriptions of several variations of Fabry-Perot etalon 100 that include features that can reduce absorption A. While each described embodiment includes specific features for reducing A, in general, Fabry-Perot etalons can incorporate any combination of these features.

Accordingly, in some embodiments, the Fabry-Perot etalon can have a small absorption, A, at $\lambda_m$. For example, A can be less than 10% (e.g., less than 9%, less than 8%, less than 7%, less than 6%, less than 5%, less than 4%, less than 3%, less than 2%, less than 1%, less than 0.5%, less than 0.1%).

Moreover, Fabry-Perot etalon 100, and/or its variants can have a high finesse and high $T_{max}$. For example, Fabry-Perot etalon 100, and/or its variants can have a finesse of at least 100 and $T_{max}$ more than 98% (e.g., more than 99%). Fabry-Perot etalon 100, and/or its variants can have a finesse of at least 150 and $T_{max}$ more than 85% (e.g., more than 87%, more than 90%, more than 92%, more than 95%, more than 98%). Fabry-Perot etalon 100, and/or its variants can have a finesse of at least 200 and $T_{max}$ more than 60% (e.g., more than 65%, more than 70%, more than 75%, more than 80%, more than 85%, more than 90%).

In some embodiments, the absorption, A, of the Fabry-Perot etalon can be reduced by selecting an alignment layer material with low absorption at the operating wavelength. PVA is an example of an alignment layer material with low absorption in the 1.5 μm wavelength range. PVA may have a lower absorption in this wavelength range than many other commonly used alignment layer materials (e.g., polyimides). Use of highly hydrolyzed PVA (e.g., 98% or more) can reduce the alignment layers susceptibility to moisture. Furthermore, use of high molecular weight PVA can further reduce introduction of impurities into liquid crystal layer 150.

Figure 6:
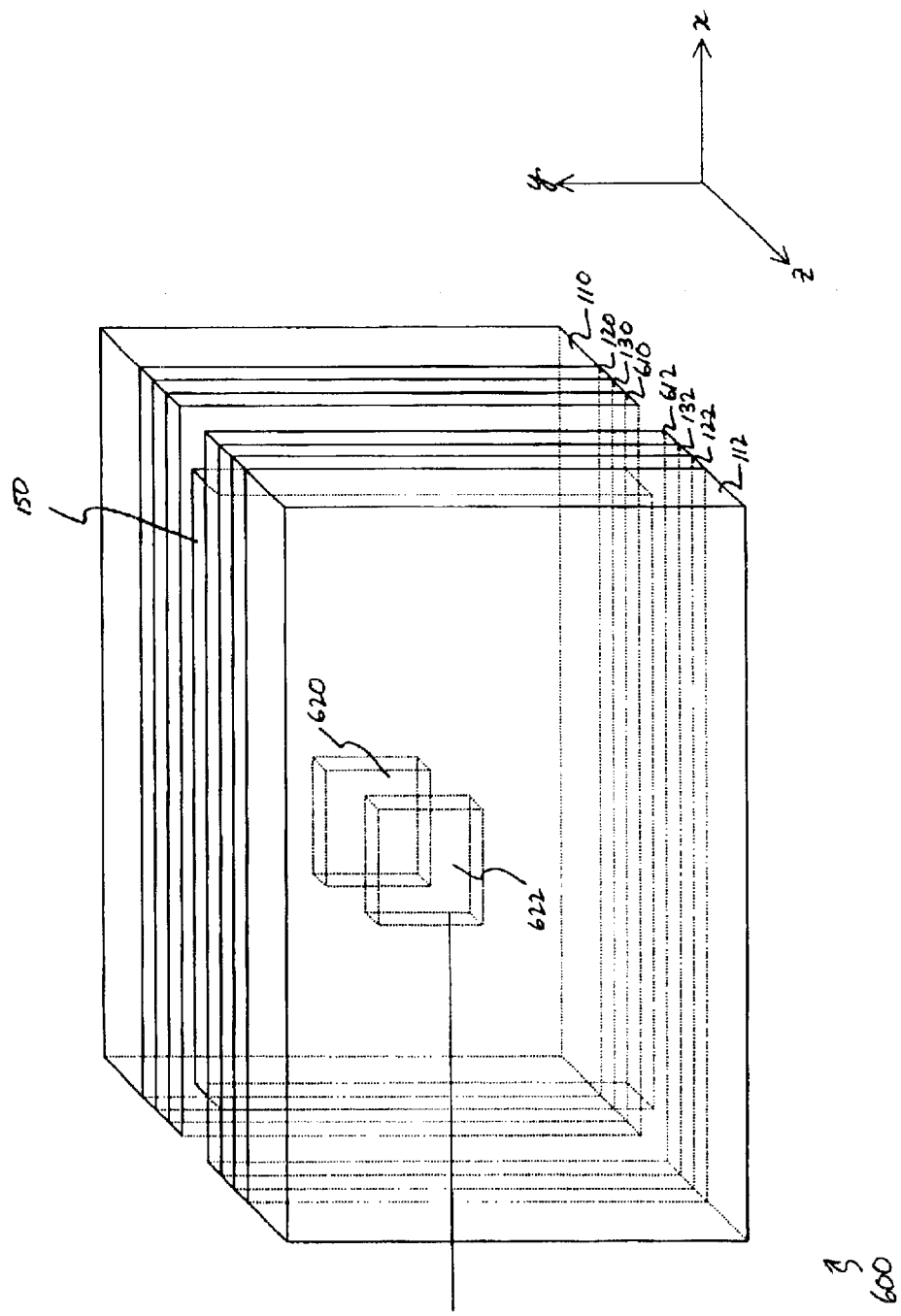
FIG. 6 is a perspective view of another embodiment of a liquid crystal Fabry-Perot etalon.

In some embodiments, alignment of the liquid crystal layer can be achieved using patterned alignment layers. Referring to FIG. 6, liquid crystal Fabry-Perot etalon 600 includes patterned alignment layers 610 and 612 that have regions 620 and 622, respectively, which are substantially devoid of alignment layer material. Although the alignment layer was patterned to have nominally no material in these regions, there is nonetheless a homogeneous alignment induced in the liquid crystal. With zero applied voltage, liquid crystal molecules in liquid crystal layer 150 adjacent regions 620 and 622 align parallel to the buffing direction of alignment layers 620 and 622, respectively. With an applied voltage, the liquid crystal molecules orient similarly to liquid crystal molecules adjacent alignment layer material. Accordingly, the electro-optic performance of liquid crystal layer is similar to a Fabry-Perot etalon having uniform alignment layers.

The size is regions 620 and 622 is larger than the beam diameter of an incident optical signal. Typically, regions 620 and 622 will have a minimum dimension of at least 10 μm in the plane of the respective substrates. However, in some embodiments, regions 620 and 622 can have a minimum dimension much larger than 10 μm. For example, regions 620 and 622 can have a minimum dimension greater than 0.5 mm (e.g., greater than 1 mm, such as 2 mm or more).

Regions 620 and 622 are spatially registered with respect to each other, and define an aperture in which an optical signal propagating parallel to the z-axis can traverse Fabry-Perot etalon 600 without passing through alignment layer material. Accordingly, any absorption losses in Fabry-Perot etalon 600 that would occur for an optical signal passing through the alignment layer material are reduced, if not avoided completely. Accordingly, the Fabry-Perot etalon absorption, A, is reduced compared a similar Fabry-Perot etalon with uniform alignment layers.

While the present embodiment includes regions 620 and 622 that are substantially devoid of alignment layer material, other embodiments can include regions in which the thickness of alignment layers 610 and 612 is greatly reduced compared to the rest of the respective alignment layers. For example, the ratio of the thickness of the alignment layer in regions 620 and 622 to the thickness of the rest of alignment layers 610 and 612 can be less than 1:2 (e.g., less than 1:4, less than 1:10, less than 1:100).

Patterned alignment layers can be prepared in any of a number of ways. For example, alignment layer material can be printed on a substrate (e.g., screen printed or ink-jet printed). Alternatively, patterned alignment layers can be prepared using lithographic techniques, such as photolithography and plasma ashing.

Although the above-described embodiments refer to buffed alignment layers, other alignment layer materials and techniques can be used to align liquid crystal layer 150. For example, photoalignment techniques using, e.g., OptoAlign™ materials, available from Elsicon, Inc. (Wilmington, Del.) or linearly photopolymerizable polymer (LPP) materials, available from Rolic (Basel, Switzerland). Examples of other alignment techniques include using oriented polymers, such as stretched PVA.

Choice of alignment materials also depends on the chosen mode of operation of the liquid crystal. While the foregoing embodiments include alignment materials for homogeneously aligning liquid crystal molecules in liquid crystal layer 150, alignment materials that homeotropically align liquid crystal molecules or produce a pretilt of the liquid crystal layer can also be used.

Figure 7B:
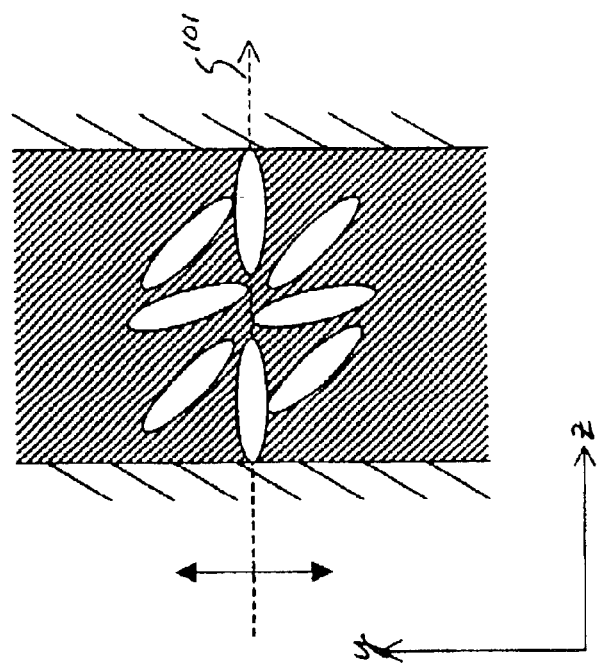
FIG. 7(b) is a schematic diagram showing the homeotropically aligned liquid crystal layer with a non-zero applied voltage.
Figure 7A:
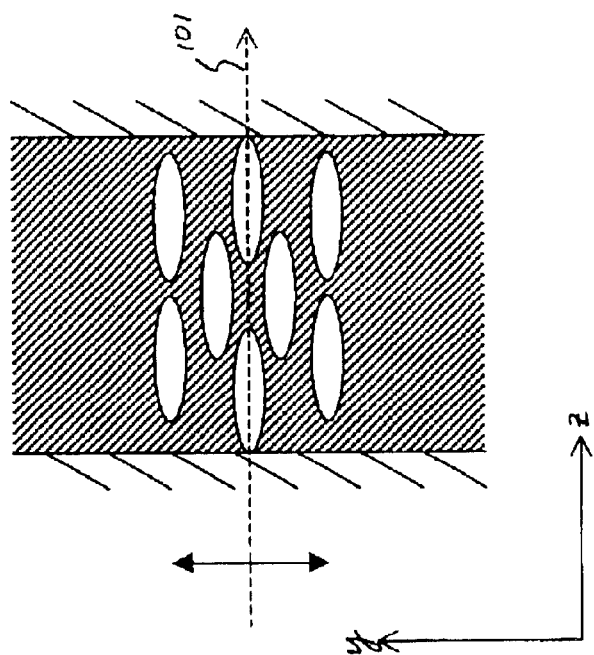
FIG. 7(a) is a schematic diagram showing a homeotropically aligned liquid crystal layer with a zero applied voltage.

For example, with reference to FIG. 7($a$) and FIG. 7($b$), in some embodiments, liquid crystal layer 150 is a vertically aligned liquid crystal layer. Vertical alignment of the liquid crystal layer is achieved by using a homeotropic alignment material in alignment layers, which aligns the liquid crystal molecules with the nematic director oriented parallel to the z-axis and orthogonally to the plane of the substrate, as shown in FIG. 7($a$).

In the present embodiment, the liquid crystal used has a negative dielectric anisotropy (i.e., $\Delta\epsilon<0$). For example, the liquid crystal can be MBBA, which has a $\Delta\epsilon$ of −0.7. In the presence of an applied voltage, the macroscopic electrostatic energy is minimized when the liquid crystal director is orthogonal to the electric field vector. In other words, an applied electric field of sufficient strength causes the liquid crystal molecules to tilt away from optical axis 101, as shown in FIG. 7(*b*). Correspondingly, the effective refractive index of liquid crystal layer 150 changes in response to the applied electric field.

Figure 9:
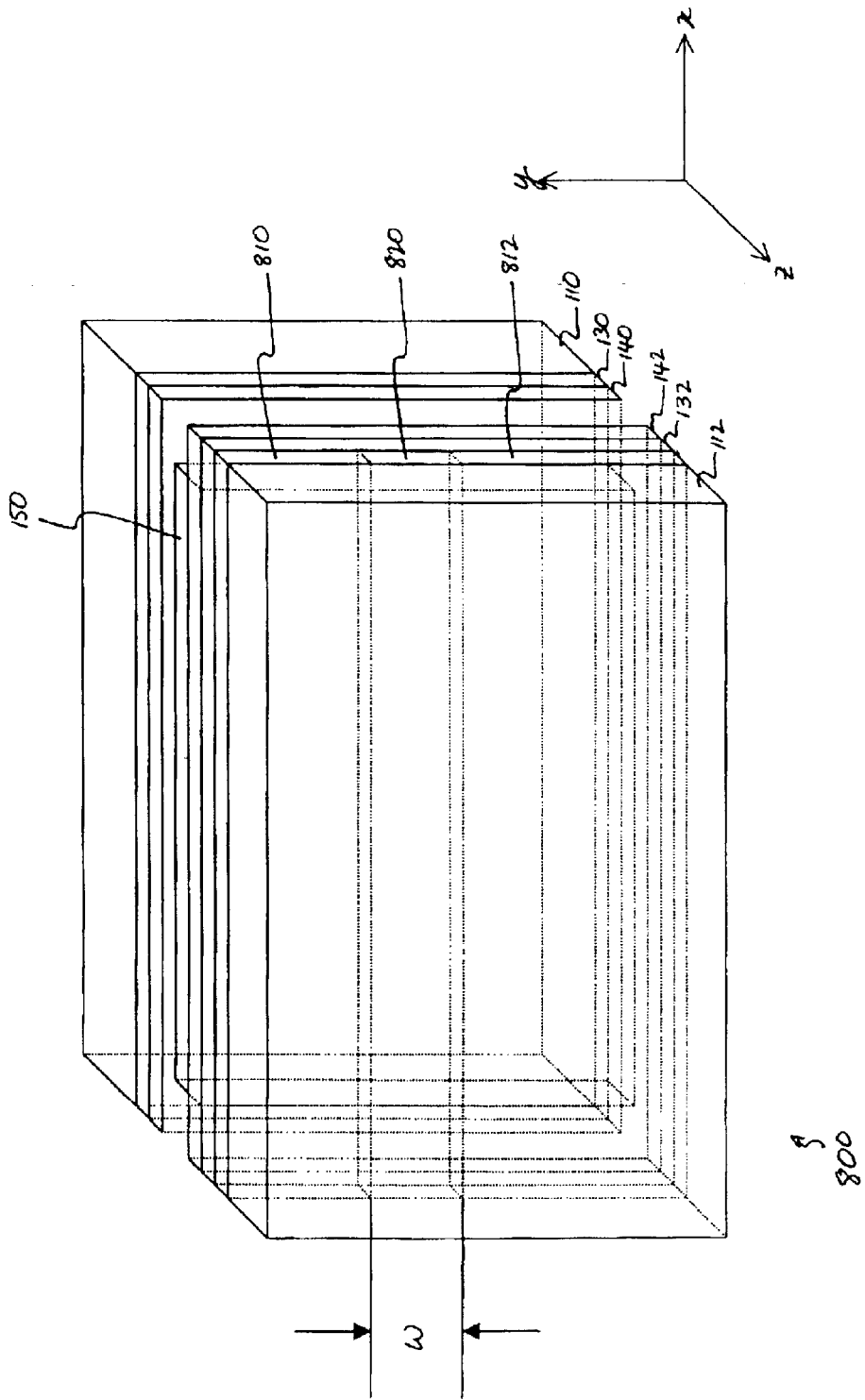
FIG. 9 is a perspective view of the liquid crystal Fabry-Perot etalon of FIG. 8.

While the foregoing embodiments employ parallel electrode geometries to generate a uniform electric field across liquid crystal layer 150, other electrode geometries can also be used. Referring to FIG. 8 and FIG. 9, an example of another electrode geometry is one in which the electrodes share a common substrate. Second substrate 112 of Fabry-Perot etalon 800 supports first and second electrodes 810 and 812, whereas first substrate 110 does not support any electrodes.

Application of a voltage across electrodes 810 and 812 produces an electric field in liquid crystal layer 150 between the electrodes. For a homogeneously aligned liquid crystal with the alignment direction at a non-zero angle with respect to the y-axis, the electric field causes a twist in the director distribution in the x-y plane. Correspondingly, the electric field changes the effective refractive index for a polarized optical signal propagating parallel to optical axis 101. This mode of operation is used in some commercial liquid crystal displays, and is commonly called in-plane switching mode (IPS-mode), because the liquid crystal director remains parallel to the plane of the substrates.

An area 820 between electrodes 810 and 812 provides an aperture for an optical signal, where the optical signal can traverse Fabry-Perot etalon 800 without propagating through the electrode. In such embodiments, there is no absorption of the optical signal by the electrodes. Accordingly, overall transmission of Fabry-Perot etalon 800 can be increased compared to Fabry-Perot etalons in which the signal must traverse the electrodes.

A distance, w, between electrodes 810 and 812 is sufficiently large to allow passage of an optical signal (e.g., at least 10 $\mu$m). Note that a threshold voltage required to create a twist of the director in the liquid crystal layer is proportional to the distance, w, between the electrodes. Accordingly, w can be kept to a minimum to reduce the drive voltage of Fabry-Perot etalon 800. For example, in some embodiments, w is less than about 100 $\mu$m, such as 50 $\mu$m or less.

While reflector 132 is disposed between patterned electrodes 810 and 812 and alignment layer 142, patterned electrodes can also be disposed inside the optical cavity without substantially affecting the Fabry-Perot etalon absorption, A (e.g., between reflector 132 and alignment layer 142). Moreover, as the optical signal propagating along optical axis 101 does not traverse the electrodes, conducting materials that are opaque at the optical signal wavelength can be used for the electrodes. For example, electrodes 810 and 812 can be copper, aluminum, or gold electrodes.

Other liquid crystal modes, in addition to IPS mode, can be used with patterned electrodes. For example, a vertically aligned liquid crystal mode can be used. In this example, the liquid crystal molecules in layer 150 have a positive dielectric anisotropy. With zero applied voltage, they are vertically aligned. When a voltage is applied, the liquid crystal molecules tilt towards the y-axis in response to the electric field.

In some embodiments, there may be more than one transmission order available the Fabry-Perot etalon within the available tuning range. If the effective refractive index of the liquid crystal layer decreases with increasing applied voltage, the resonant wavelength will shift to a lower order at higher voltages. For example, at a first, maximum voltage, $V_1$, the effective index of the liquid crystal layer, $n(V_1)$, may provide a resonant wavelength, $\lambda_r$, corresponding to:

$$\lambda_r = \frac{2n(V_1)d}{m}, \quad (9)$$

while at a second applied voltage, $V_2$, where $V_2 < V_1$, the effective refractive index of the liquid crystal layer $n(V_2)$ provides the same resonant wavelength, $\lambda_r$, now corresponding to:

$$\lambda_r = \frac{2n(V_2)d}{m+1}. \quad (10)$$

There are other configurations (e.g., using a liquid crystal with a negative birefringence, or a vertically-aligned liquid crystal mode) wherein the effective refractive index of the liquid crystal layer increases with increasing voltage. In such cases, the resonance order will shift to higher values with increasing voltage.

In some embodiments, transmission at $\lambda_r$ may be higher at $V_1$ than at $V_2$. At least in part, this is due to decreased light scattering in the liquid crystal layer at higher applied voltages. Light scattering in the nematic phase originates from long-range orientational fluctuations of the liquid crystal directors. The magnitude of these fluctuations, and hence the amount of scattering, depends on the order parameter, S. At a fixed temperature, S increases with increasing electric field strength. Thus, in some embodiments, driving the Fabry-Perot etalon in a high-voltage regime (e.g., to access the lowest/highest available resonance order) can reduce loss due to light scattering of an optical signal in liquid crystal layer 150 that would occur at a transmission peak wavelength at lower voltages. Since these scattering losses contribute to the Fabry-Perot etalon absorption, A can be reduced by operating the Fabry-Perot etalon at relatively high, rather than low, drive levels.

Correspondingly, $T_{max}$ of an Fabry-Perot etalon at a wavelength, $\lambda_{max}$, driven at a voltage $V_1$ can be greater than $T_{max}(V_1)$ for the Fabry-Perot etalon at a wavelength, $\lambda_{max}$, driven at a voltage $V_2$, $T_{max}(V_2)$, wherein $V_1 > V_2$. For example, $T_{max}(V_1)$ can be at least 1% greater than $T_{max}(V_2)$ (e.g., at least 2% greater, at least 3% greater, at least 5% greater, at least 8% greater, at least 10% greater).

The number of resonance orders, $\Delta m$, at a wavelength, $\lambda_r$, available within the tuning range of a Fabry-Perot etalon is given by:

$$\Delta m = \frac{2\Delta n d}{\lambda_r} \quad (11)$$

Thus, one can design an etalon to have multiple available orders at $\lambda_r$ by selecting a liquid crystal material with a suitably large birefringence, and constructing the etalon to have a suitably thick liquid crystal layer. For example, if one selected a liquid crystal material to provide a $\Delta n$ of 0.1, and wanted to have two available orders at 1,550 nm, one would select d=15.5 $\mu$m. Similarly, d=23.25 $\mu$m would provide three available orders at 1,550 nm.

Figure 10:
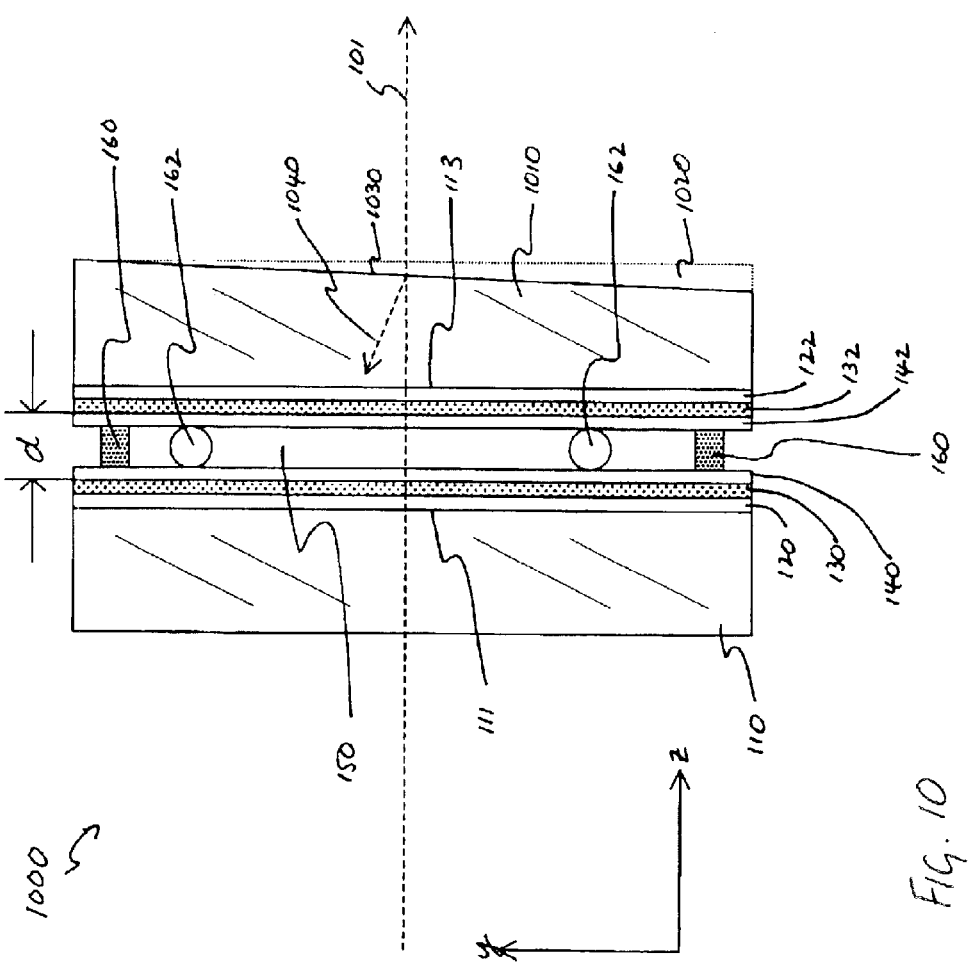
FIG. 10 is a cross-sectional view of another embodiment of a liquid crystal Fabry-Perot etalon.

Optical interfaces in the above-described Fabry-Perot etalons can lead to spurious reflections. Spuriously reflected beams can interfere with the optical signal, often degrading optical performance. A wedged surface reduces the interference from such reflections. Referring to FIG. 10, a Fabry-Perot etalon 1000 is shown. Similar to Fabry-Perot etalon 100, Fabry-Perot etalon 1000 has first substrate 110 joined to a second substrate 1010 by edge seal 160. Substrate 1010 has a wedged portion 1020. An optical signal propagating along optical axis 101 is incident on surface 1030. Surface 1030 reflects a portion of the optical signal. Because surface 1030 is not orthogonal to optical axis 101, this spurious reflection propagates in a direction 1040 non-parallel to optical axis 101. Thus, the wedge eliminates the spatial overlap of the optical signal with the reflected light and reduces any optical interference that would otherwise have occurred between these signals.

In other embodiments, other wedge angles can be employed with unequal wedges on either substrate oriented along either axis of the face of the substrate. For example, a 0.5° wedge can be polished on each of the outer faces of the substrates along the same axis but with the wedges in opposite directions. The resulting assembly is wedged by 1 degree and the liquid crystal layer is not parallel to either substrate's outer face.

Fabry-Perot etalons may include other features to improve their stability, functionality, and/or performance. For example, environmental changes can affect the performance of a Fabry-Perot etalon. One environmental factor is temperature. As the temperature of the Fabry-Perot etalon changes, the liquid crystal expands and contracts. As liquid crystal layer 150 is very nearly incompressible, expansion of the liquid crystal leads to changing pressures on the substrates 110 and 112, and edge seal 160. Extreme pressure changes can lead to mechanical failure of the Fabry-Perot etalon. Moreover, smaller pressure changes can deform the substrates at optical axis 101, thus deform the cavity gap, d, of the Fabry-Perot etalon.

Figure 11:
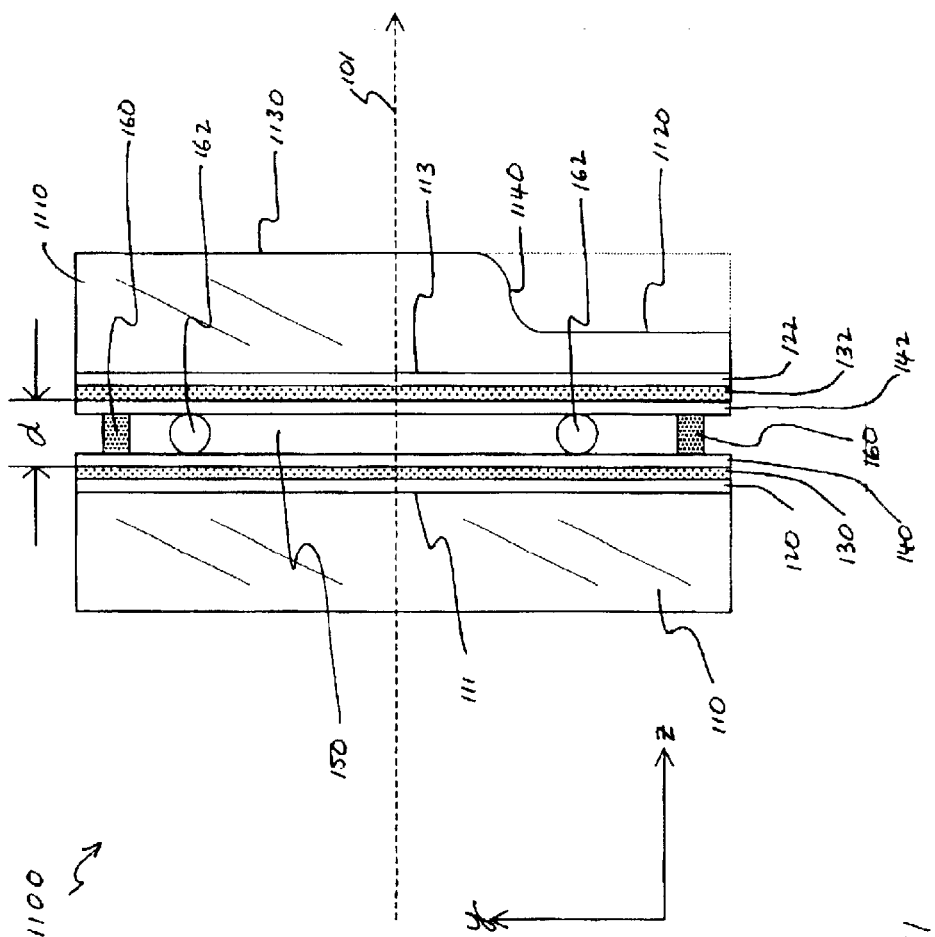
FIG. 11 is a cross-sectional view of a further embodiment of a liquid crystal Fabry-Perot etalon.

Referring to FIG. 11, to reduce the variations in liquid crystal layer thickness and thus variations in optical performance, a Fabry-Perot etalon 1100 has a substrate 1110 of varying thickness. A second portion 1120 of substrate 1110 is substantially thinner than a first portion 1130. Portion 1120 is also thinner than substrate 110. As a result, second portion 1120 has a stiffness that is substantially less than the stiffness of first portion 1130 or substrate 110 (assuming they are constructed from materials with similar mechanical properties). As pressure builds in Fabry-Perot etalon 1100 due to thermal expansion of the liquid crystal in liquid crystal layer 150, second portion 1120 deflects outwards, increasing the volume available for the liquid crystal and moderating the increase in pressure. This provides a stress relief function for Fabry-Perot etalon 1100.

Similarly as the liquid crystal layer 150 contracts, the internal pressure decreases. Such a pressure drop can lead to cavitation, or bubble formation, in liquid crystal layer 150 degrading optical performance. Under extreme operating conditions, such a low internal pressure can even deform the thickness of liquid crystal layer 150 at optical axis 101. To avoid such low internal pressures, second portion 1120 deflects inward as the liquid crystal layer contracts with temperature. This moderates the internal pressure of liquid crystal layer 150.

The stiffness of portion 1120 relative to portion 1130 and relative to substrate 110 over a large range of deformations of portion 1120 ensures that stress relief deformation occurs primarily in portion 1120 and not appreciably in portion 1130. This maintains the uniformity of liquid crystal layer 150 thickness over a large range of temperatures. Furthermore, by moderating both the maximum and minimum pressure inside the device, the stress relief function of portion 1120 reduces the probability of pressure related failure of the cell.

The stress relief function is provided by the thickness of portion 1120 relative to portion 1130 and relative to substrate 110. For example, the thickness of portion 1120 is typically at least 100 microns less than portion 1130. A transition of thickness between portion 1120 and portion 1130 is formed by a connecting portion 1140. Connecting portion 1140 preferably provides a smooth transition from the thicker portion 1130 to the thinner portion 1120. This avoids fracturing substrate 1110 as portion 1120 deflects due to changes in the volume of the liquid crystal.

Furthermore, in embodiments that use Fabry-Perot etalon 1100 adjacent to another optical component, the stress relief function is typically not impeded by a planar optical element that sits flush against portion 1130.

Figure 12:
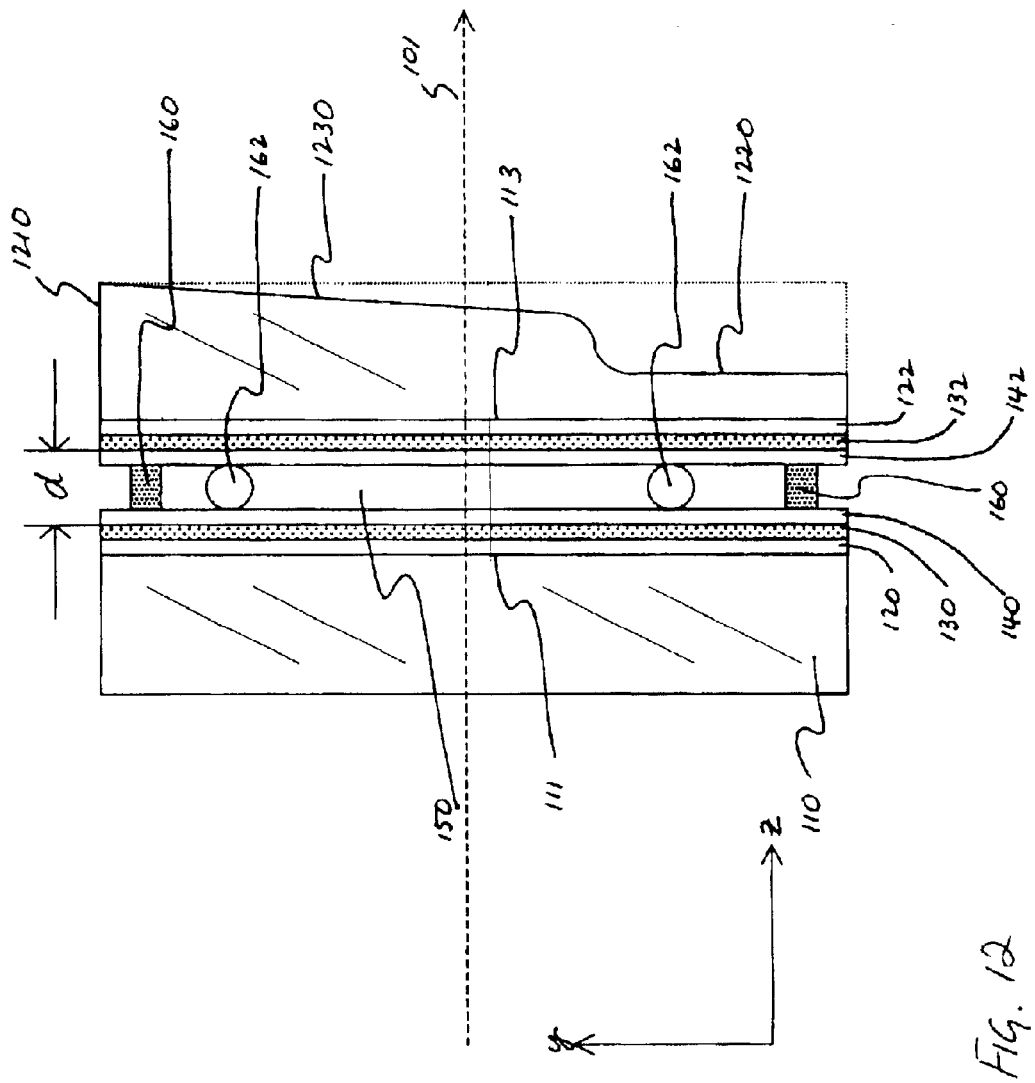
FIG. 12 is a cross-sectional view of yet another embodiment of a liquid crystal Fabry-Perot etalon.

Referring to FIG. 12, Fabry-Perot etalon 1200 has a substrate 1210 that includes a thin portion 1220 and a thick portion 1230. Additionally, portion 1230 is ground to have a wedge angle. Accordingly, substrate 1210 provides a stress relief function similar to Fabry-Perot etalon 1100 (see FIG. 11) and a reduction in performance degradation due to spurious reflections similar to Fabry-Perot etalon 1000 (see FIG. 10).

Figure 13:
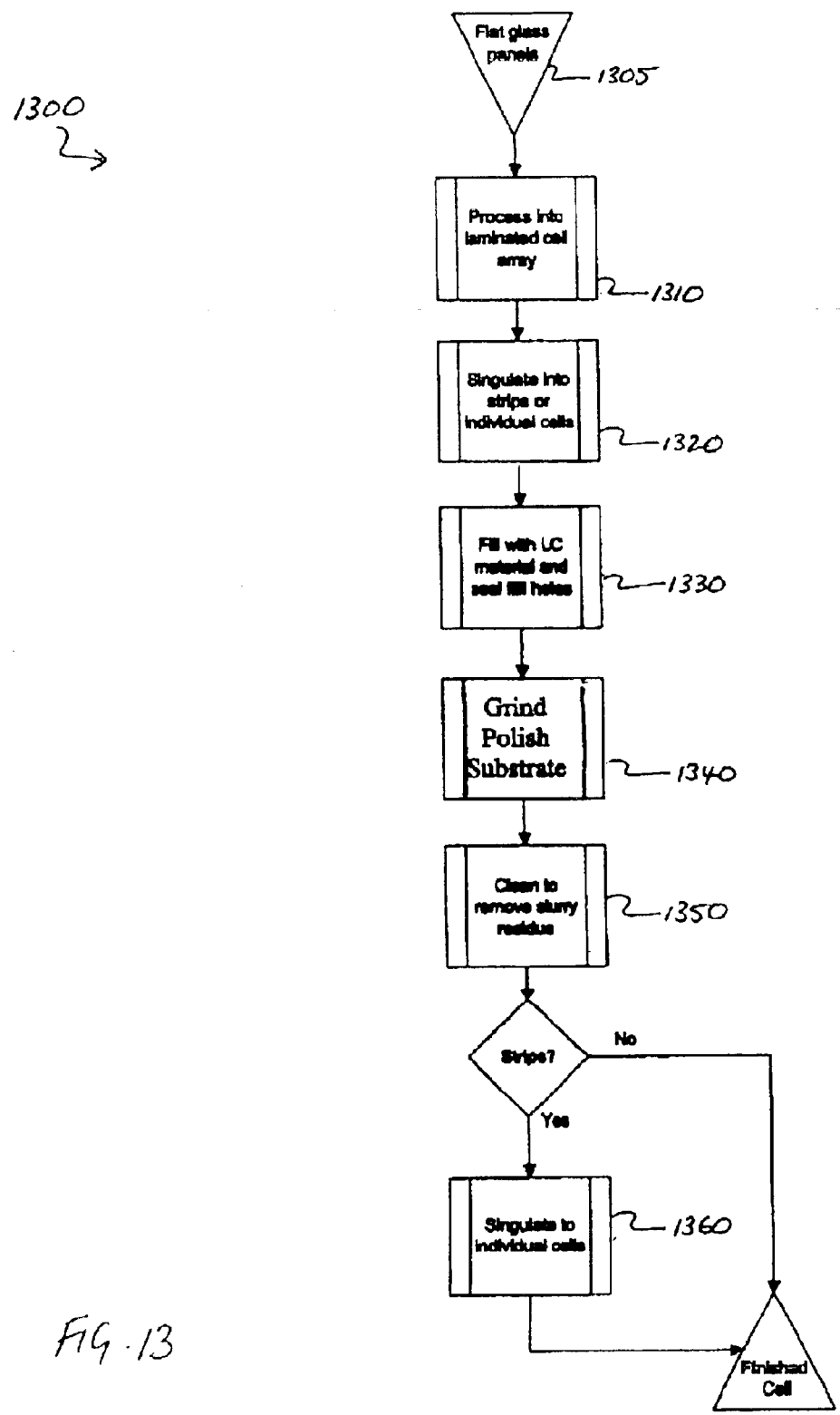
FIG. 13 is a flow-cart of a process for making liquid crystal Fabry-Perot etalons.

Referring to FIG. 13, etalons having wedged substrates and/or substrates of varying thickness can be made according to the method outlined in flowchart 1300. The method preferably begins by obtaining two panels (Step 1305). Positioning and manipulating these panels uses known manufacturing techniques and equipment and therefore, for ease of manipulation and precision placement and alignment, the panels are preferably flat planar panels. The method processes the two panels into a laminated array of cells (Step 1310). Typically, a dispenser forms an array of adhesive beads by repeatedly depositing adhesive beads onto one of the panels in a tiled pattern. The other panel is placed onto the bead and the two panels are joined together. Spacers are used to provide an exact and uniform spacing between the two glass panels. Typical panels sizes are, for example, about 1 mm thick and 50 mm to 600 mm on a side. The spacing between the substrates is, for example, about 1 $\mu$m to about 30 $\mu$m.

These arrays can be 1×1, 1×N, or M×N sized arrays. The method is amenable to mass production of the liquid crystal devices. The processing of a single array panel with M×N individual devices highlights the efficiency of the method. All M×N devices are moved, positioned, and processed at the same time. This increases reliability and throughput. Optionally, the panelized assembly of cells is partially singulated into strips of cells or completely singulated into individual cells (Step 1320). Typically, a scribe or a laser singulates the panelized assemblies. Using either the individual cells or the partially singulated strips each cell is filled with liquid crystal and the fill hole is subsequently sealed (Step 1330). In other embodiments, the filling and/or singulating of the cells is performed later in the method.

Figure 14A:
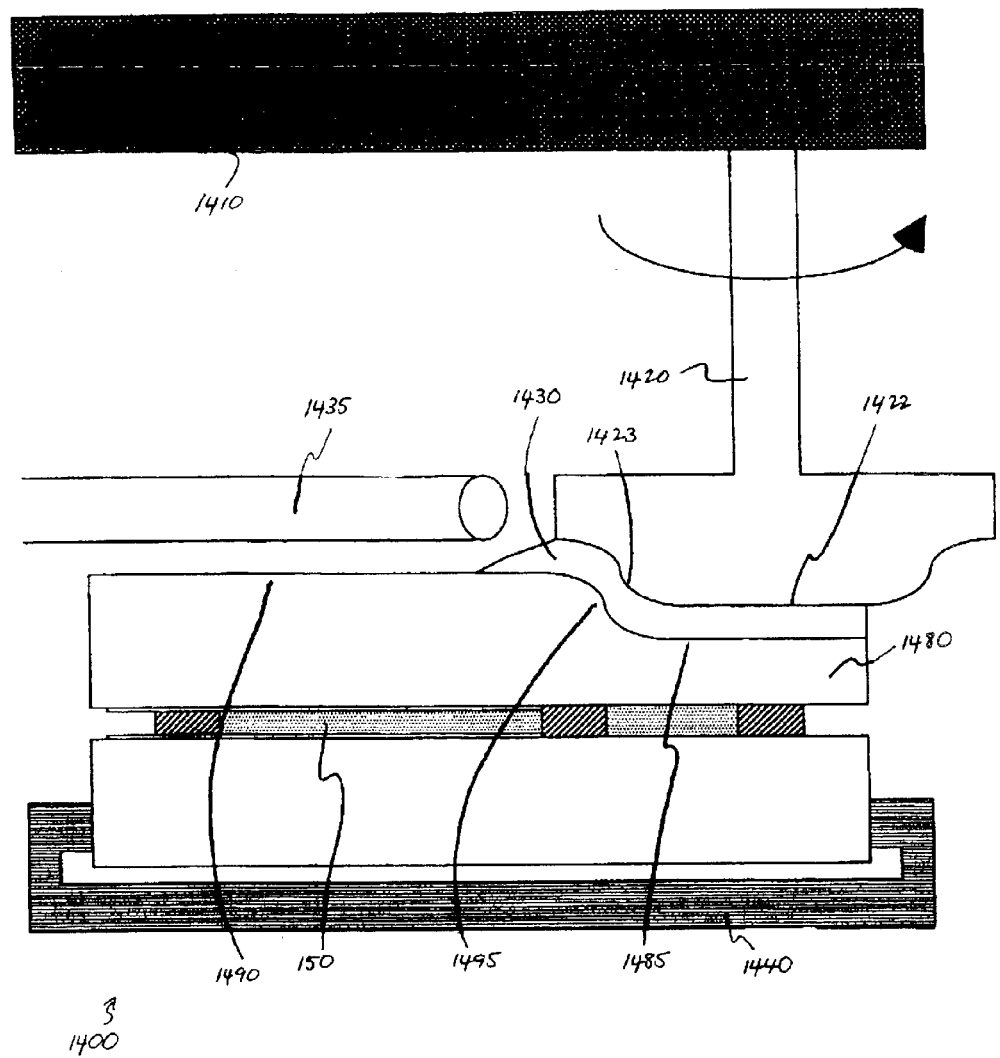
FIGS. 14(a) and 14(b) are schematic diagrams showing a process step in the manufacture of liquid crystal Fabry-Perot etalons.
Figure 14B:
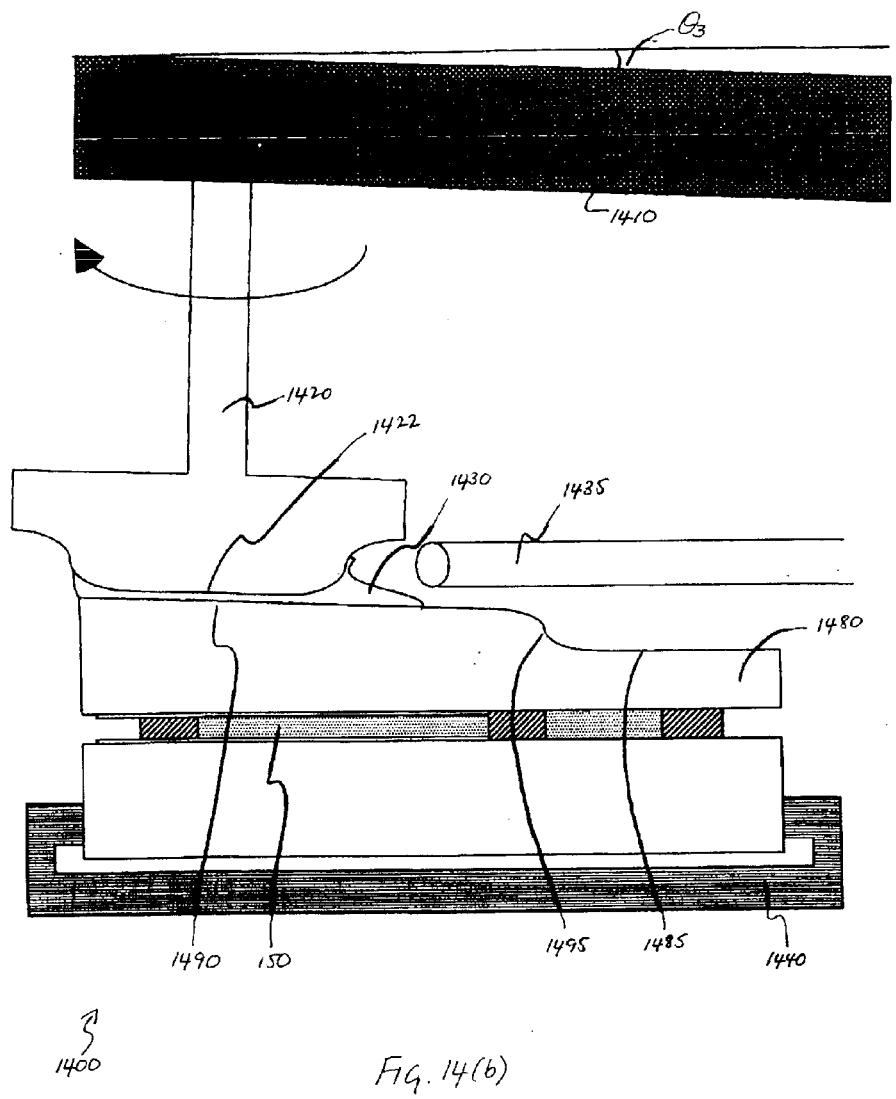

A grinder and/or polisher grinds and/or polishes the surface of a substrate (Step 1340). The grinding and polishing is applied to one or both substrates of the device. Either substrate can be ground or polished to form either one or both of a wedged portion or a stress relief portion in the substrate. Referring to FIG. 14(*a*), a schematic diagram of an apparatus for grinding a stress relief portion of a substrate is shown. A grinder 1400 removes material from the surface of a substrate 1480. The grinder 1400 includes a chuck 1440 that holds the liquid crystal device or the substrate while plate 1420 moves with an orbital motion relative to substrate 1480. Positioner 1410 maintains the relative position and orientation of plate 1420 with respect to substrate 1480. A grinding slurry 1430 is introduced to the surface of substrate 1480 by slurry injector 1435. Typically, the slurry 1430 includes an abrasive compound. The orbital action of the plate relative to a portion 1485 of the surface of substrate 1480 in conjunction with the slurry grinds away material from the surface. Portion 1490 of substrate 1480 is not ground at this stage of manufacture. The polishing plate 1420 includes a flat 1422 and a connecting portion 1423. The flat and connecting portion are designed such that as material is removed from the substrate, both thinner second portion 1485 and a connecting portion 1495 are formed. As portion 1485 provides the stress relief for the device, this portion of the surface need not be sufficiently smooth for high precision optical performance. Thus, while portion 1485 is being formed, the grade of abrasive is chosen to remove material efficiently. In a preferred embodiment, the liquid crystal cells are filled and sealed prior to the grinding of step 740. This provides a number of advantages. The liquid crystal layer 150 provides hydrostatic support for the substrate and thus reduces device failure during grinding. Furthermore, the laminated device is typically stronger and more robust than the substrates alone and therefore the laminated substrate can be thinned substantially more than the substrate alone allowing for a greater flexibility in design of the devices. Furthermore, contamination, especially water contamination, of the empty volumes can be a problem. Therefore, it is preferable to fill and seal the devices soon after the substrates are laminated together.

Referring to FIG. 14(*b*), a schematic diagram of the grinding apparatus being used for wedging a portion of a liquid crystal device is shown. After grinding portion 1485 of substrate 1485, plate 1420 is tilted relative to substrate 1480. The tilt angle θ$_3$ is determined by the amount of wedge desired. The chuck 1440 moves the cell relative to the plate such that the plate is positioned over portion 1490 of substrate 1480. Again, the orbital motion of the plate relative to the substrate in conjunction with the slurry removes material to form the desired wedge on the surface of portion 1490. Portion 1490 is typically the optical portion. As the substrate material is removed, slurry injector 1435 introduces finer and finer grades of abrasives. This polishing step produces a surface of suitable flatness and surface smoothness for precision optical applications. For example, a standard optical finish is flat to $1/10\, \Lambda_0$, with smoothness of a few nm. In some embodiments, the polishing uses another machine built specifically for that purpose.

In embodiments that fill and seal the cells before grinding, the temperature of the substrate, liquid crystal layer 150 and preferably the entire cell are preferably maintained at a constant temperature. Typically, this temperature is close to the desired operating temperature of the device. Excessive temperature or temperature variation during the grinding and polishing produce pressures due to expansion of liquid crystal layer 150 as described above. If the optical portion of the substrate is deflected during the grinding/polishing process then, once liquid crystal layer 150 cools and the deflection eases, the surface may no longer be flat. To avoid this, the temperature of the cell is controlled during grinding and polishing of portion 1490. Typically, grinding and polishing maintains the temperature to within 5° C. of the nominal operating temperature. In some embodiments, slurry injector 1435 regulates the temperature of the injected slurry in order to control the temperature of the device.

In one embodiment, grinder/polisher 1400 is a planetary, single-face polisher with a slurry that includes diamond paste and high purity ethylene glycol. Typically, plate 1420 is made of copper. A minimal amount of slurry is used so that there is minimal contamination of the side and back faces of the liquid crystal cells by the slurry.

Typically, planar glass substrates of about 1 mm thick are used. The grinding and polishing described in step 740 can form the structures in the substrates before or after the individual cells are filled and sealed. In other embodiments, grinding and polishing can be applied to substrates before lamination. The methods for forming either one or both of stress relief portions and wedged portions in substrates can be used to efficiently produce these structures in large numbers.

Figure 15:
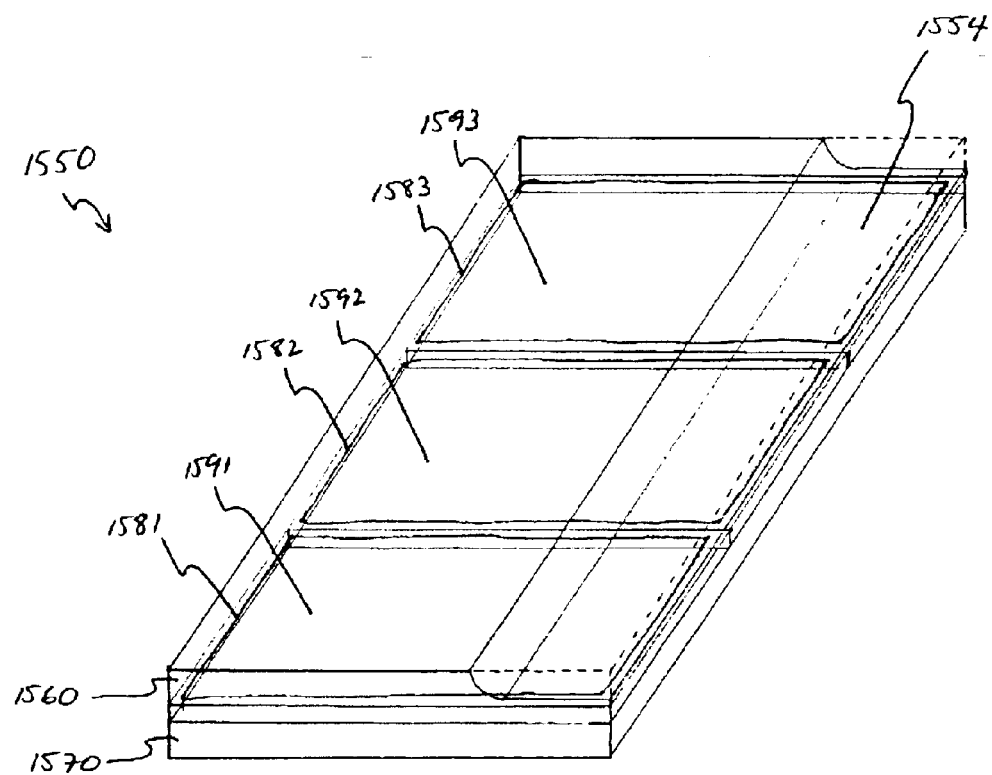
FIG. 15 is a perspective view of three liquid crystal Fabry-Perot etalons prior to singulating.

An example of the mass production of the cells is shown in FIG. 15. A strip array of liquid crystal cells 1550 is shown after completion of the grinding in step 1340 of method 1300. The strip array 1550 includes two substrates 1560 and 1570. The substrates are laminated with adhesive beads 1581, 1582, and 1583, which form edge seals for liquid crystal layers 1591, 1592, and 1593, respectively. Array 1550 has a stress relief portion 1554 formed in substrate 1560. Other embodiments have one or both of stress relief and wedging in one or both substrates.

In some embodiments, the wedge and/or the stress relief portion of the substrate can be formed using methods other than grinding or polishing. Other well-known methods for forming the structures in substrates are machining, etching, cutting, sawing, casting, extruding, and molding.

Once the desired wedge or stress relief portion is formed in one or both of the substrates, the devices are cleaned to remove the slurry residue (Step 1350). If the panels were singulated into individual cells in step 1320, then the cells are complete. If instead the panels were cut into strips, then the cells are singulated into individual cells (Step 1360). In embodiments that skipped either one or both of the steps of singulating and filling the individual cells, the panels are singulated into strips or cells (if not done so already) and the cells are filled and sealed. Typically, a scribe, dicing saw, or a laser singulates the panelized assemblies.

Figure 17:
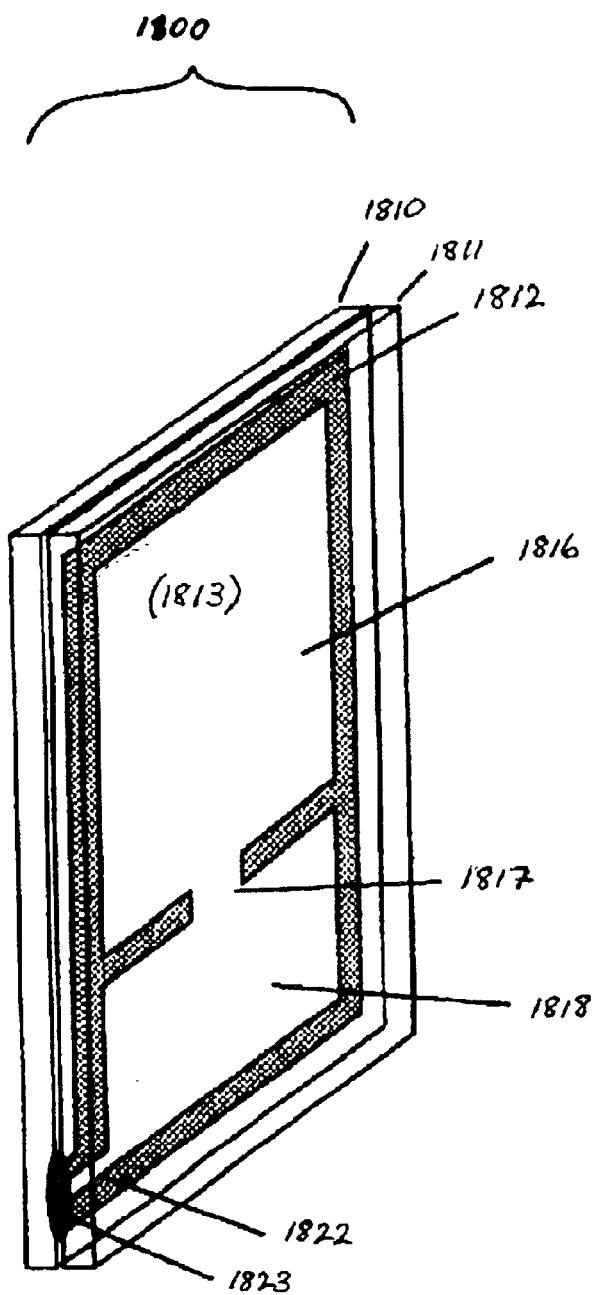
FIG. 17 is a perspective view of a further embodiment of a liquid crystal Fabry-Perot etalon.

The edge-seal adhesive can also be applied to help accommodate for pressure changes in the LC layer. For example, FIG. 17 shows an Fabry-Perot etalon 1800 in which substrates 1810 and 1811 are bonded together with a predeterminately shaped bead or strip of sealing epoxy 1812, which forms an enclosed cavity which receives and contains a volume of liquid crystal material 1813 between the substrates 1810, 1811. Bead 1812 maintains the substrates 1810, 1811 a desired distance apart while securing them together, in an art recognized manner, or bead 1812 may simply maintain the distance between the substrates as the substrates are secured together by other means. After filling the cavity with fluid by means of fill hole 1822, the cell is sealed with sealing epoxy 1823.

The substrates are generally relatively thin, generally in the range 0.4–1.1 mm thick, although the thickness chosen can vary as a matter of design choice. Transparent electrodes, reflectors, and alignment layers (not shown) are provided on the inner surfaces of the substrates.

The shape of Fabry-Perot etalon 1800, and in particular the shape configuration of the seal formed by the epoxy bead 1812, is chosen to create two distinct portions or zones joined by a fluid communication channel or passage 1817 through which liquid crystal material 1813 can flow to equilibrate pressure in the two regions. The first portion is an aperture region 1816, is formed with the shape and dimensions determined by the optical requirements that the Fabry-Perot etalon must serve, as a routine matter of design choice. It is connected by channel 1817 to the second portion, i.e., an adaptive pressure relief reservoir 1818, which may form an optically operative part of the Fabry-Perot etalon 1800, or may only exhibit limited optical performance. Taken together, the aperture region 1816 and the adaptive region 1818 form the portions of interest for Fabry-Perot etalon 1800, it being recognized that other components may and generally do form additional parts of a Fabry-Perot etalon, such as electrodes, other substrate portions, etc.

Figure 18:
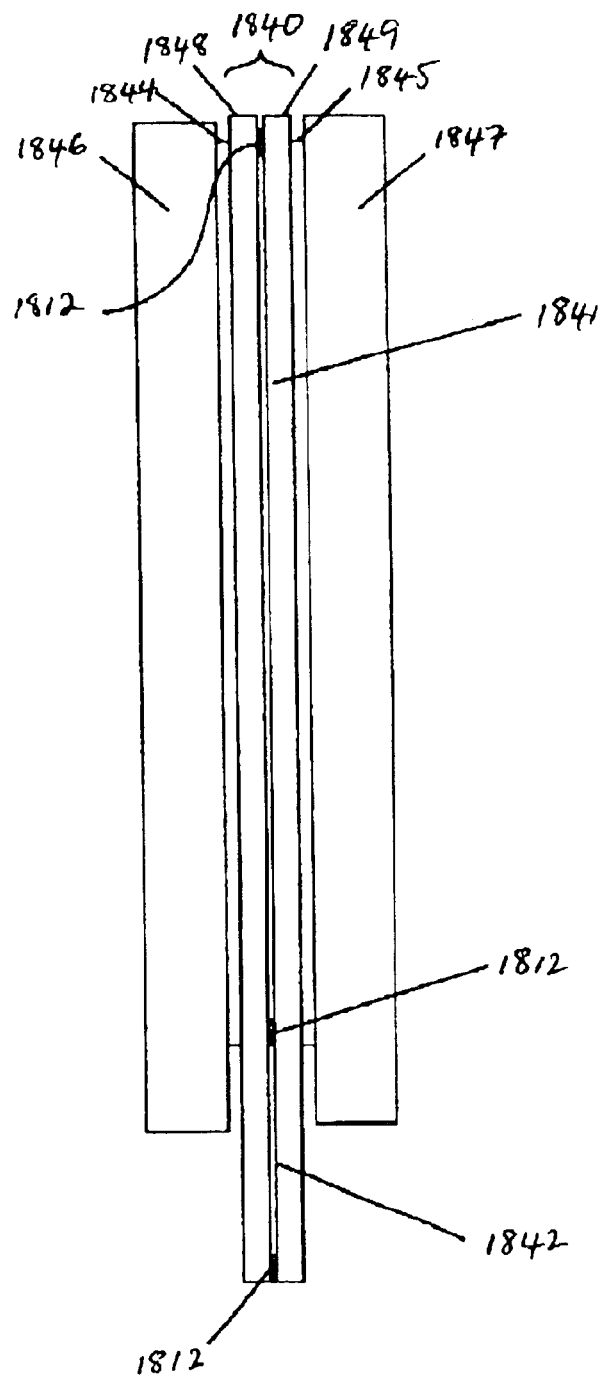
FIG. 18 is a cross-sectional view of another embodiment of a liquid crystal Fabry-Perot etalon.

In some embodiments, structural elements can be bonded to the outer surfaces of the Fabry-Perot etalon to help accommodate pressure changes in the LC layer. With reference to FIG. 17 and FIG. 18, a Fabry-Perot etalon is shown in perspective and side view, respectively, comprising a single cell with thick precision windows 1846, 1847 and incorporating pressure relief for expansion or contraction of the liquid crystal fluid 1813. Fabry-Perot etalon 1840 is constructed similarly to Fabry-Perot etalon 1800 just described, and includes two substrates 1848 and 1849, joined with an edge-seal adhesive 1812 which is formed to create aperture region 1841 and adaptive region 1842, connected by a channel 1817 (not seen in FIG. 18) which permits equalization pressure between portions 1841, 1842 in accordance with Pascal's principle. Transparent spacer members 1844 and 1845 are joined to Fabry-Perot etalon 1840 bonded with optical adhesive, and have a shape chosen to cover the aperture region without significantly extending into the adaptive region 1842. Further bonded to these are precision windows 1846 and 1847, which, by virtue of their thickness, have significant stiffness as compared to the lower stiffness of adaptive region 1842. The windows 1846, 1847 are so constructed as to not yield to volumetric changes in the liquid crystal material 1813, as a result of their being bonded to the aperture region 1841 restrain the aperture region from varying in geometric shape or interior volume as the liquid crystal volume changes. Spacer members 1844, 1845 form means which permits adaptive portion 1842 to expand in an unrestrained manner in response to changes in volume of liquid crystal material 1813 without contacting windows 1846, 1847.

In FIG. 18 the windows 1846, 1847 are shown as being larger in shape than the spacer members 1844 and 1845, as well as having greater thickness. Thus, a portion of each window overhangs the edge of the associated spacer layer 1844, 1845, respectively. This permits, by way of non-limiting example, circular precision windows to be used with a cell having a square or irregularly-shaped aperture region.

Thermal expansion in both the aperture region 1841 and the adaptive region 1842 contribute to an overall volumetric expansion in the liquid crystal material 1813, which is taken up or equalized by deformation of thin substrates 1848 and 1849 in the adaptive region 1842. As pressure or thermally induced volumetric change occurs in the liquid crystal material 1813, there is substantially no change in the geometric shape of the precision windows, nor in the volume between the thin substrates 1848, 1849 which are restrained by the windows, nor of the liquid crystal layer itself, in the aperture region 1841.

It will of course be recognized that the means by which the aperture portion may be stiffened or restrained is not limited to the above described mounting of restraining members such as thick windows 1846, 1847.

Figure 19:
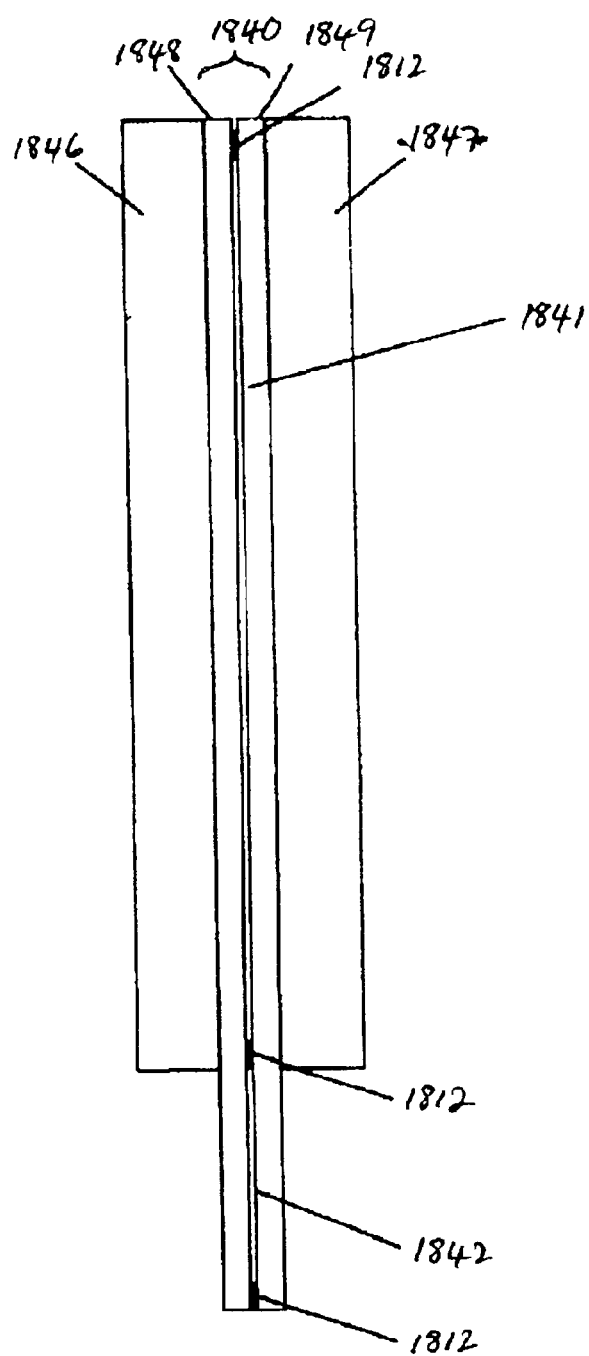
FIG. 19 is a cross-sectional view of yet another embodiment of a liquid crystal Fabry-Perot etalon.

With reference to FIG. 19, an assembly is shown in side view wherein the precision windows 1846 and 1847 have a size and shape that permits them to perform directly as the restraining member without need for transparent spacer members such as those pictured in FIG. 18 as 1844 and 1845.

Additional examples of liquid crystal devices having stress relief portions are described in U.S. patent application Ser. No. 10/144,362, entitled "LIQUID CRYSTAL ASSEMBLY AND METHOD OF MAKING," to Randall T B D J. Deary et al., filed May 13, 2002, and in U.S. Pat. No. 5,953,087, entitled "APPARATUS FOR STRESS RELIEVING LIQUID CRYSTAL DISPLAYS," to Clifford C. Hoyt, issued Sep. 14, 1999, the entire contents of which are hereby incorporated by reference.

Figure 16:
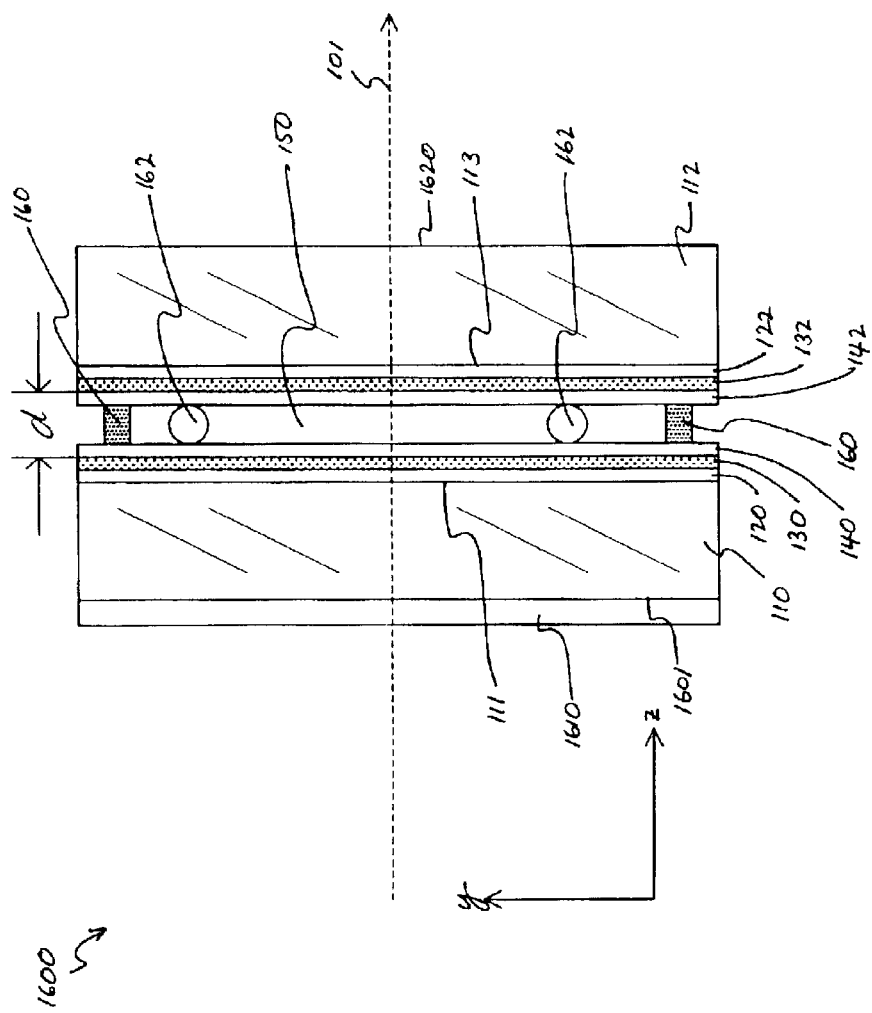
FIG. 16 is a cross-sectional view of another embodiment of a liquid crystal Fabry-Perot etalon.

In some embodiments, additional optical structures may be coated, laminated, and/or otherwise adhered to one or both of the exposed surfaces of a liquid crystal Fabry-Perot etalon. For example, an optical filter 1610 is coated onto outer surface 1601 of Fabry-Perot etalon 1600 as shown in FIG. 16. Optical filter 1610 is a bandpass dielectric filter. The transmission band of optical filter 1610 overlaps with the tuning range of Fabry-Perot etalon 1600. Note that integrally forming optical filter 1610 on surface 1601 reduces transmission losses associated with Fresnel losses associated with additional optical interfaces in the path of an incident optical signal.

Use of optical filter 1610 can increase the effective FSR of Fabry-Perot etalon 1600 without a corresponding increase in finesse, F. For example, suppose on wishes to create an Fabry-Perot etalon with FSR=100 that is tunable over about 30 nm within that range, and has a bandwidth, B=1 nm. According to Eq. (8), such a configuration would require, F=100, which in turn, would require R=96.9%. Taking A=1%, for example, would result in a $T_{max}$ of about 45%. Conversely, one could build an Fabry-Perot etalon with FSR=50 nm (e.g., by making the cavity twice as thick as the previous example), and combine it with an optical filter having a transmission band corresponding to the desired 30 nm tuning range. The optical filter blocks adjacent orders from the Fabry-Perot etalon, thereby increasing the effective FSR of the Fabry-Perot etalon. Now, to achieve bandwidth, B=1 nm, F=50. F=50 is achieved with R=93.9%. Assuming absorption, A, is fixed at 1%, and the optical filter does not significantly affect transmission at $\lambda_m$, then $T_{max}$ is boosted to about 70%.

Alternatively, or additionally, other optical components can be affixed to substrate surface 1601 and/or exit surface 1620. For example, a linear polarizer can be affixed to substrate 110. The transmission axis of the polarizer can be aligned to pre-polarize an optical signal parallel to the alignment direction of liquid crystal molecules in LC layer 150. In another example, an anti-reflection coating is applied to surface 1601. The anti-reflection coating can reduce reflective losses of an optical signal at this optical interface.

Figure 20:
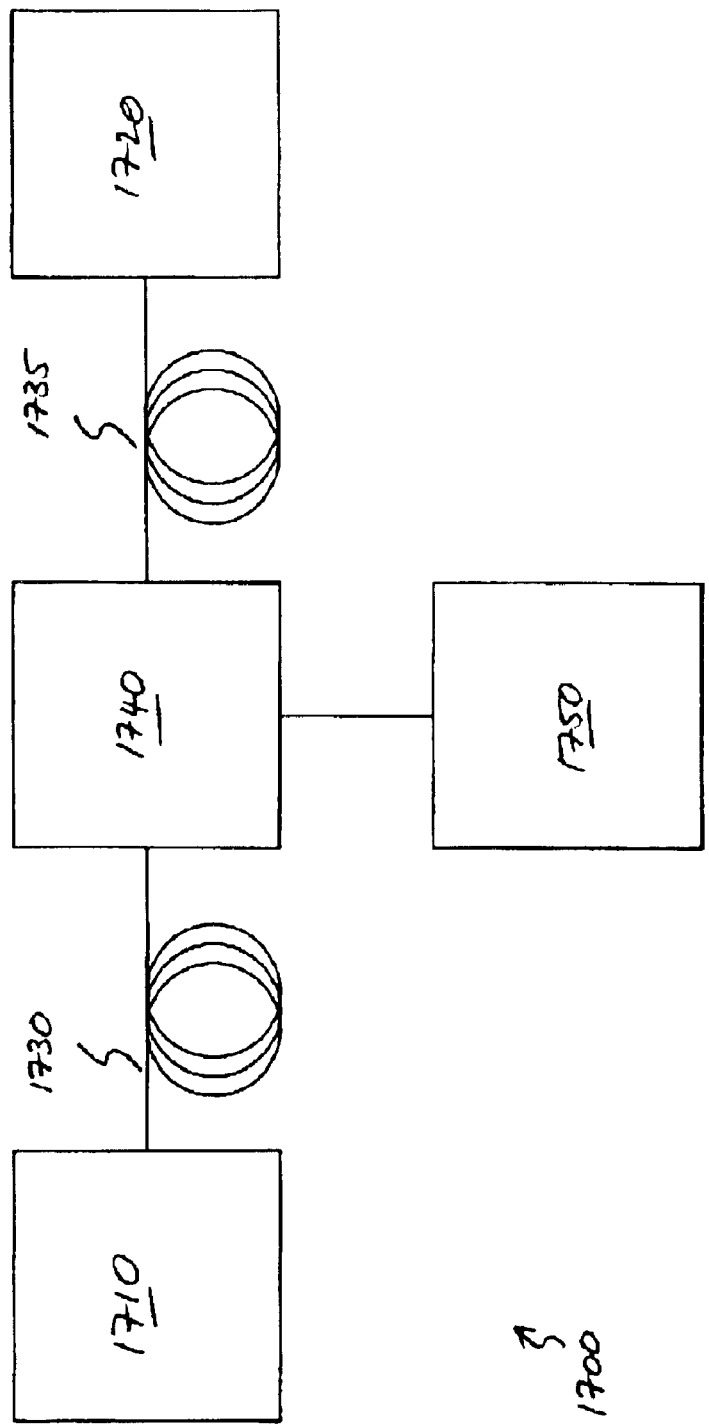
FIG. 20 is a schematic diagram of a telecommunication system including a liquid crystal Fabry-Perot etalon.

Any of the Fabry-Perot etalons described herein may be used in optical telecommunications systems. FIG. 20 shows a schematic diagram of an optical telecommunication system 1700 including a source node 1710 and a detection node 1720, which are coupled to one another by optical transmission lines 1730 and 1735. A Fabry-Perot etalon 1740 filters an optical signal propagating between transmission lines 1730 and 1735. A signal from a controller 1750, which is coupled to the etalon electrodes, tunes the transmission wavelength of Fabry-Perot etalon 1740.

Optical transmission lines 1730 and 1735 may include one or more segments of transmission fiber and one or more segments of dispersion compensation fiber. Source node 1710 may be the original source of an optical signal directed along the transmission line or it may be an intermediate node that redirects the optical signal to transmission line 1730, optically amplifies it, and/or electronically detects it and optically regenerates it. Furthermore, source node 1710 may include components for multiplexing or demultiplexing multiple optical signals at different wavelengths. Similarly, detector node 1720 may be the final destination for the optical signal transmitted along transmission line 1735, or it may be an intermediate node that redirects, optically amplifies, and/or electrically detects and optically regenerates the optical signal. In addition, detector node 1720 may also include components for multiplexing or demultiplexing multiple optical signals at different wavelengths.

The optical signal transmitted along the transmission line may be a wavelength division multiplexed (WDM) signal that includes multiple signals at corresponding wavelengths. Suitable wavelengths for the system include those within a range of about 1.2 microns to about 1.7 microns, which corresponds to many long-haul systems in use today, as well those within a range of about 0.7 microns to about 0.9 microns, which corresponds to some metro systems currently being considered.

A number of embodiments of the invention have been described. Nevertheless, it will be understood that various modifications may be made without departing from the spirit and scope of the invention. For example, while the above-described embodiments utilize an electric field to change the effective refractive index of the liquid crystal layer, alternative external stimuli can also be used (e.g., magnetic fields). Accordingly, other embodiments are within the scope of the following claims.

What is claimed is:

1. A liquid crystal device, comprising
two substrates sandwiching a layer of liquid crystal, wherein each substrate supports at least a reflector and an alignment layer comprising polyvinyl alcohol, and wherein the reflectors define an Fabry-Perot etalon having a resonant wavelength, $\lambda_m$,
wherein the polyvinyl alcohol is at least 95% hydrolyzed.

2. The liquid crystal device of claim 1, wherein the Fabry-Perot etalon has an absorption less than 5% at $\lambda_m$.

3. The liquid crystal device of claim 1, wherein each substrate further supports an electrode.

4. The liquid crystal device of claim 3, wherein for each substrate, the electrodes is positioned between the reflector and the substrate.

5. The liquid crystal device of claim 1, wherein at least one substrate supports a pair of electrodes.

6. The liquid crystal device of claim 3 or 5, further comprising a controller coupled to the electrodes, which during operation applies a voltage across the liquid crystal layer.

7. The liquid crystal device of claim 1, wherein in the absence of an electric field in the liquid crystal layer, liquid crystal in the liquid crystal layer is homogeneously aligned parallel to the reflectors.

8. The liquid crystal device of claim 1, wherein in the absence of an electric field in the liquid crystal layer, liquid crystal in the liquid crystal layer is homeotropically aligned orthogonal to the reflectors.

9. The liquid crystal device of claim 1, further comprising spacers positioned between the substrates to maintain distance between the reflectors.

10. The liquid crystal device of claim 1, wherein the alignment layers are buffed alignment layers.

11. The liquid crystal device of claim 1, wherein at least one of the alignment layers comprises an aperture region substantially devoid of the alignment material.

12. The liquid crystal device of claim 11, wherein both of the alignment layers comprises an aperture region devoid of the alignment material.

13. The liquid crystal device of 12, wherein there exists an optical path through the aperture region along which an optical signal can traverse the Fabry-Perot etalon without traversing alignment material.

14. The liquid crystal device of claim 12, further comprising a source positioned to direct an optical signal through the aperture region.

15. The liquid crystal device of claim 1, wherein an outer surface of at least one of the two substrates is non-parallel to the reflectors.

16. The liquid crystal device of claim 1, wherein a first one of the substrates has a first region that is thinner than a second region of the first substrate.

17. The liquid crystal device of claim 1, wherein the reflectors comprise dielectric mirrors, configured to reflect light having wavelength $\lambda_m$.

18. The liquid crystal device of claim 1, wherein the layer of liquid crystal has an effective refractive index, and during operation the effective refractive index changes in response to an electric field in the liquid crystal layer.

19. The liquid crystal device of claim 18, wherein $\lambda_m$ changes in response to the change in the effective refractive index.

20. The liquid crystal device of claim 19, wherein $\lambda_m$ changes within a tuning range, and the tuning range is related to a birefringence of the liquid crystal.

21. The liquid crystal device of claim 1, further comprising an optical filter supported by at least one of the substrates and located outside the Fabry-Perot etalon.

22. The liquid crystal device of claim 21, wherein the optical filter substantially transmits a wavelength band including $\lambda_m$.

23. The liquid crystal device of claim 1, further comprising a member attached to a first region of at least one of the substrates, wherein the member reduces variations of a minimum distance between the reflectors caused by thermal expansion and contraction of the liquid crystal over a range of operating temperatures in the first region relative to a minimum distance between the reflectors in a second region difference from the first region.

24. A liquid crystal device, comprising:
two substrates sandwiching a layer of liquid crystal, wherein each substrate supports at least an electrode, a reflector and an alignment layer comprising an alignment material, wherein at least one of the alignment layers comprises an aperture region substantially devoid of the alignment material.

25. The liquid crystal device of claim 24, wherein both of the alignment layers comprises an aperture region devoid of the alignment material.

26. The liquid crystal device of claim 25, wherein the aperture region in the alignment layer of a first of the two substrates is registered with the aperture region in the alignment layer of a second of the two substrates.

27. The liquid crystal device of claim 26, wherein the registered aperture regions define an optical path through which an optical signal can traverse the Fabry-Perot etalon without traversing alignment material.

28. A liquid crystal device, comprising
two substrates sandwiching a layer of liquid crystal, wherein each substrate supports at least an electrode, a reflector and an alignment layer, wherein the reflectors define a Fabry-Perot etalon having a resonant wavelength, $\lambda_m$, and a first one of the substrates has a first region that is thinner than a second region of the first substrate,
wherein the layer of liquid crystal is sealed between the two substrates.

29. The liquid crystal device of claim 28, wherein the first region of the first substrate is sufficiently thin relative to the second region of the first substrate to relieve stress caused by thermal expansion and contraction of the liquid crystal over a range of operating temperatures.

30. A liquid crystal device, comprising
    two substrates sandwiching a layer of liquid crystal, wherein each substrate supports at least a reflector and an alignment layer comprising polyvinyl alcohol, and wherein the reflectors define an Fabry-Perot etalon having a resonant wavelength, $\lambda_m$,
    wherein at least one of the alignment layers comprises an aperture region substantially devoid of the alignment material.

31. The liquid crystal device of claim 30, wherein both of the alignment layers comprises an aperture region devoid of the alignment material.

32. The liquid crystal device of 30, wherein there exists an optical path through the aperture region along which an optical signal can traverse the Fabry-Perot etalon without traversing alignment material.

33. The liquid crystal device of claim 30, further comprising a source positioned to direct an optical signal through the aperture region.

* * * * *